United States Patent

Kishinami et al.

[11] Patent Number: 6,118,739
[45] Date of Patent: Sep. 12, 2000

[54] OPTICAL STORAGE APPARATUS

[75] Inventors: Masaya Kishinami; Toru Ikeda; Eiji Yabuki, all of Kawasaki, Japan

[73] Assignee: Fujitsu Limited, Kawasaki, Japan

[21] Appl. No.: 09/005,251

[22] Filed: Jan. 9, 1998

[30] Foreign Application Priority Data

Aug. 5, 1997 [JP] Japan ................................ 9-210441

[51] Int. Cl.[7] .................................................. G11B 7/00
[52] U.S. Cl. ................................. 369/44.28; 369/44.32; 369/58; 369/60
[58] Field of Search ............................. 369/44.28, 44.27, 369/44.29, 44.32, 58, 32, 60, 54, 44.35, 44.36

[56] References Cited

U.S. PATENT DOCUMENTS 5,933,397   8/1999   Yamashita et al. ................... 369/44.28

FOREIGN PATENT DOCUMENTS 60-059567   4/1985   Japan.
01128240    5/1989   Japan.
02285523   11/1990   Japan.
07014197    1/1995   Japan.
08050757    2/1996   Japan.

Primary Examiner—Muhammad Edun
Attorney, Agent, or Firm—Greer, Burns & Crain, Ltd.

[57] ABSTRACT

An optical storage apparatus has an eccentricity measuring unit that measures an eccentricity amplitude of a medium and an eccentricity phase for a start position along one rotation of a disk. A region from the start position to an end position of one rotation of the medium which was measured is divided into a plurality of regions every predetermined rotational angle, and addresses are sequentially allocated to those regions. A sine value of a rotational angle, which is increased every predetermined rotational angle, has been stored in each address in an eccentricity memory. A read control unit forms an address (a) in an eccentricity memory corresponding to a rotating position of the medium where a light beam is irradiated at present while using the start position of one rotation of the medium as a reference and reads out a corresponding sine value $\sin\theta a$ from the eccentricity memory by the designation of the address (a). An eccentricity correcting unit obtains an eccentricity amount (L) on the basis of the sine value read out from the eccentricity memory and the measurement values measured by the eccentricity measuring unit, thereby controlling a VCM positioner so as to set off the eccentricity amount (L).

21 Claims, 29 Drawing Sheets

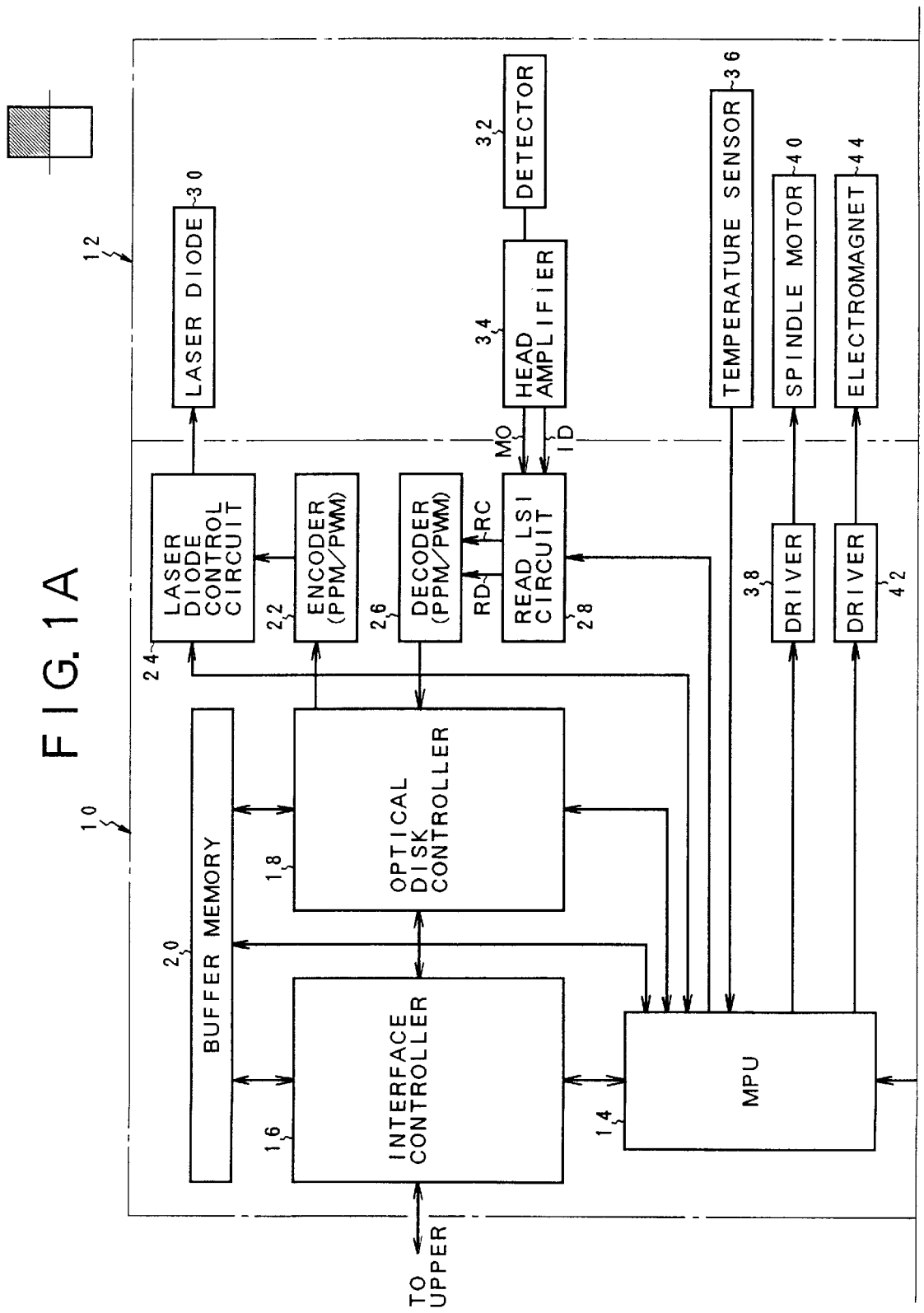

FIG. 5

| CONTROL MODE | SWITCH CONTROL STATE | | | | | | |
|---|---|---|---|---|---|---|---|
| | SW98 | SW118 | SW142 | SW156 | SW186 | SW178 |
| FOCUSING OFF | 0 | 0 | 0 | 1 | 0 | 0 |
| TRACKING OFF | 1 | 0 | 0 | 1 | 0 | 0 |
| TRACKING ON | 1 | 0 | 1 | 0 | 1 | 0 |
| FINE SEEK | 1 | 1 | 0 | 0 | 1 | 1 |
| POSITION SEEK | 1 | 0 | 0 | 1 | 0 | 1 |

FIG. 6

| CONTROL MODE | CONTROL CONTENTS |
|---|---|
| FOCUSING OFF | FOCUSING SERVO IS TURNED OFF AND THE LENS ACTUATOR IS CONTROLLED TO THE 0 POSITION BY THE LENS POSITION SIGNAL. |
| TRACKING OFF | FOCUSING SERVO IS TURNED ON AND THE LENS ACTUATOR IS CONTROLLED TO THE 0 POSITION BY THE LENS POSITION SIGNAL. |
| TRACKING ON | FOCUSING SERVO IS TURNED ON AND THE LENS ACTUATOR IS ON-TRACK CONTROLLED BY THE TRACKING ERROR SIGNAL. |
| FINE SEEK | FOCUSING SERVO IS TURNED ON. SPEED OF THE LENS ACTUATOR IS CONTROLLED. VCM IS FEED-FORWARD CONTROLLED. VCM IS CONTROLLED TO THE LENS 0 POSITION BY THE LENS POSITION SIGNAL (DOUBLE SERVO). |
| POSITION SEEK | FOCUSING SERVO IS TURNED ON. LENS ACTUATOR IS CONTROLLED TO THE 0 POSITION BY THE LENS POSITION SIGNAL. HEAD IS POSITION CONTROLLED TO THE TARGET TRACK BY THE VCM. |

F I G. 7
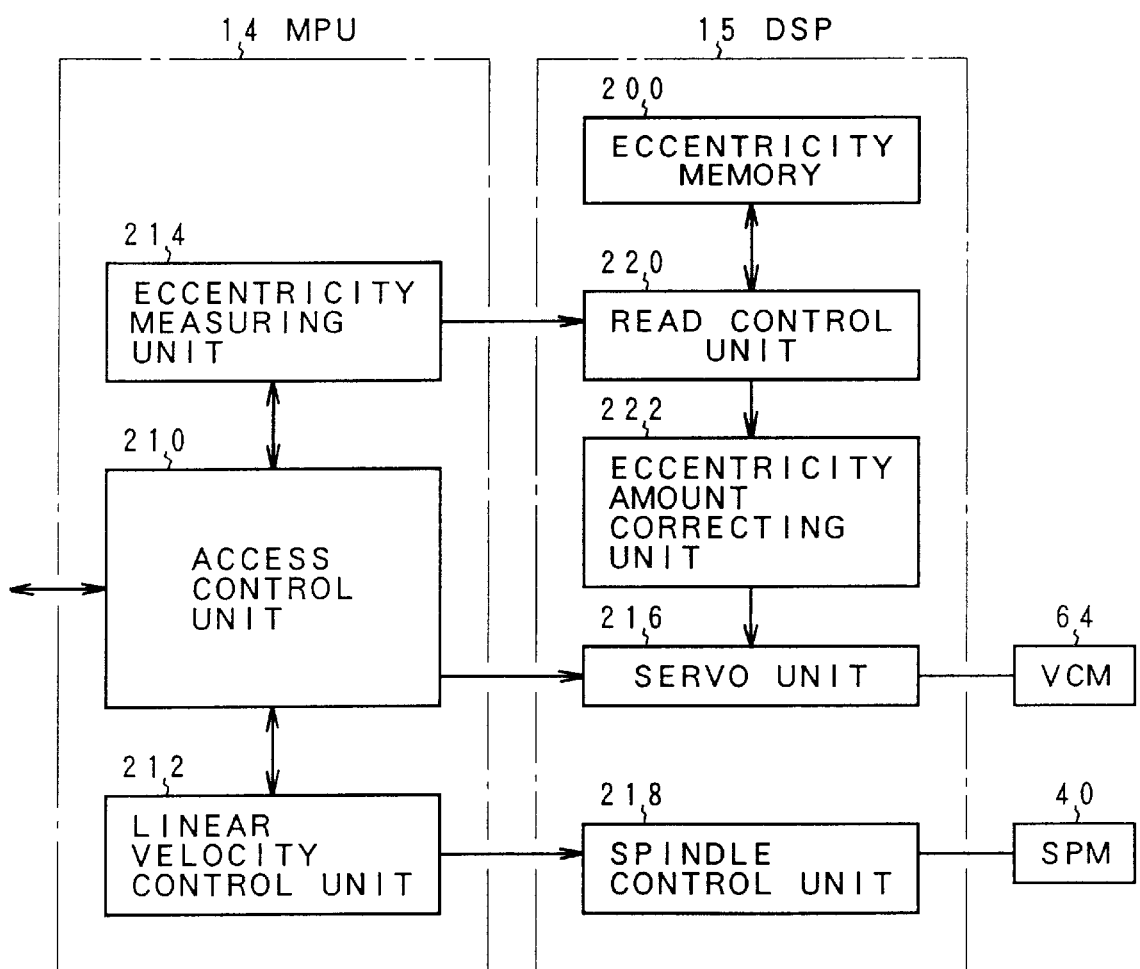

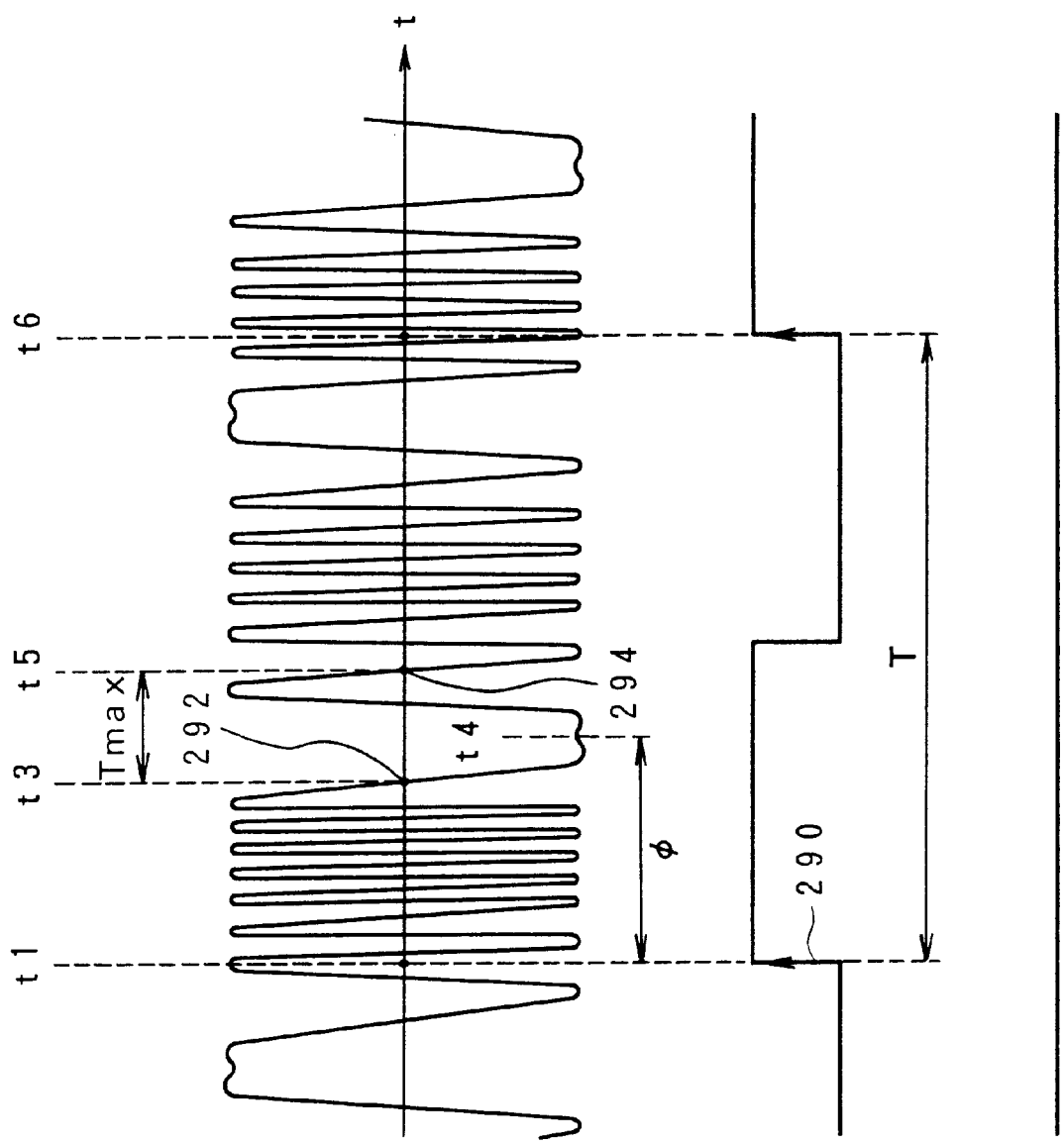
FIG. 12A TRACKING ERROR SIGNAL E2
FIG. 12B INDEX SIGNAL E4
FIG. 12C VCM CURRENT Iv

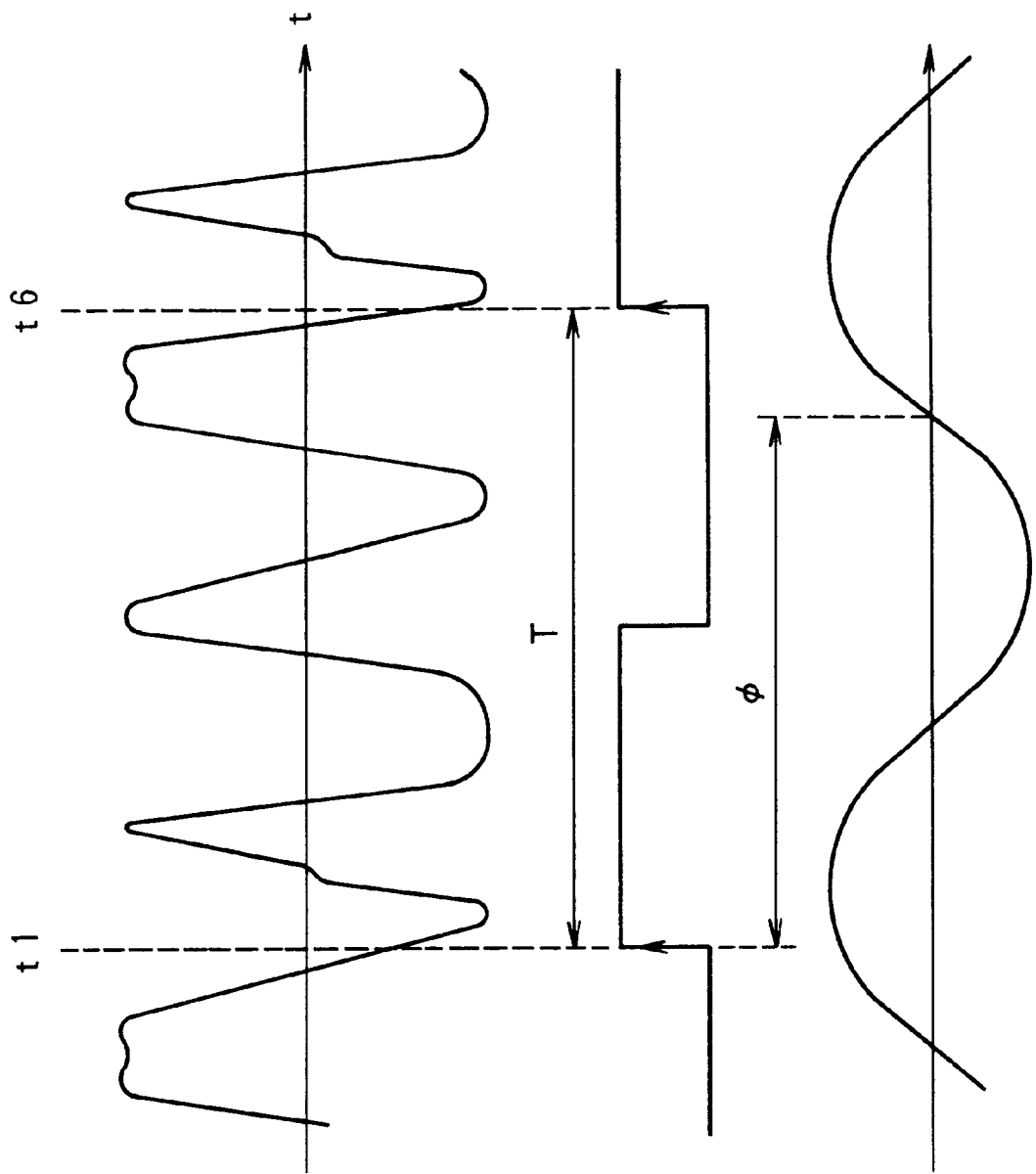
FIG. 13A TRACKING ERROR SIGNAL E2
FIG. 13B INDEX SIGNAL E4
FIG. 13C VCM CURRENT Iv (ECCENTRICITY CORRECTION ON)

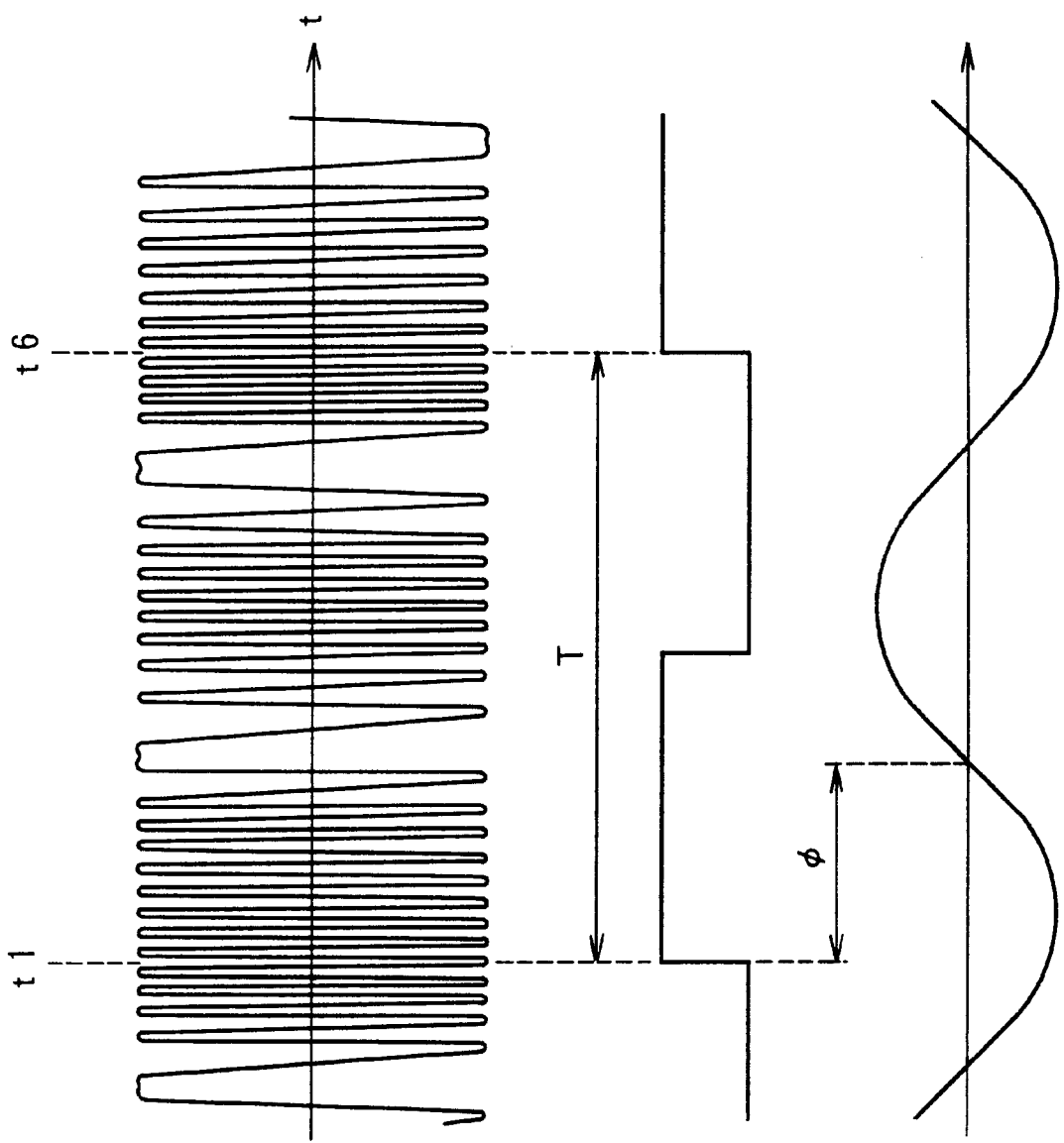
FIG. 14A TRACKING ERROR SIGNAL E2
FIG. 14B INDEX SIGNAL E4
FIG. 14C VCM CURRENT Iv (ECCENTRICITY CORRECTION ON)

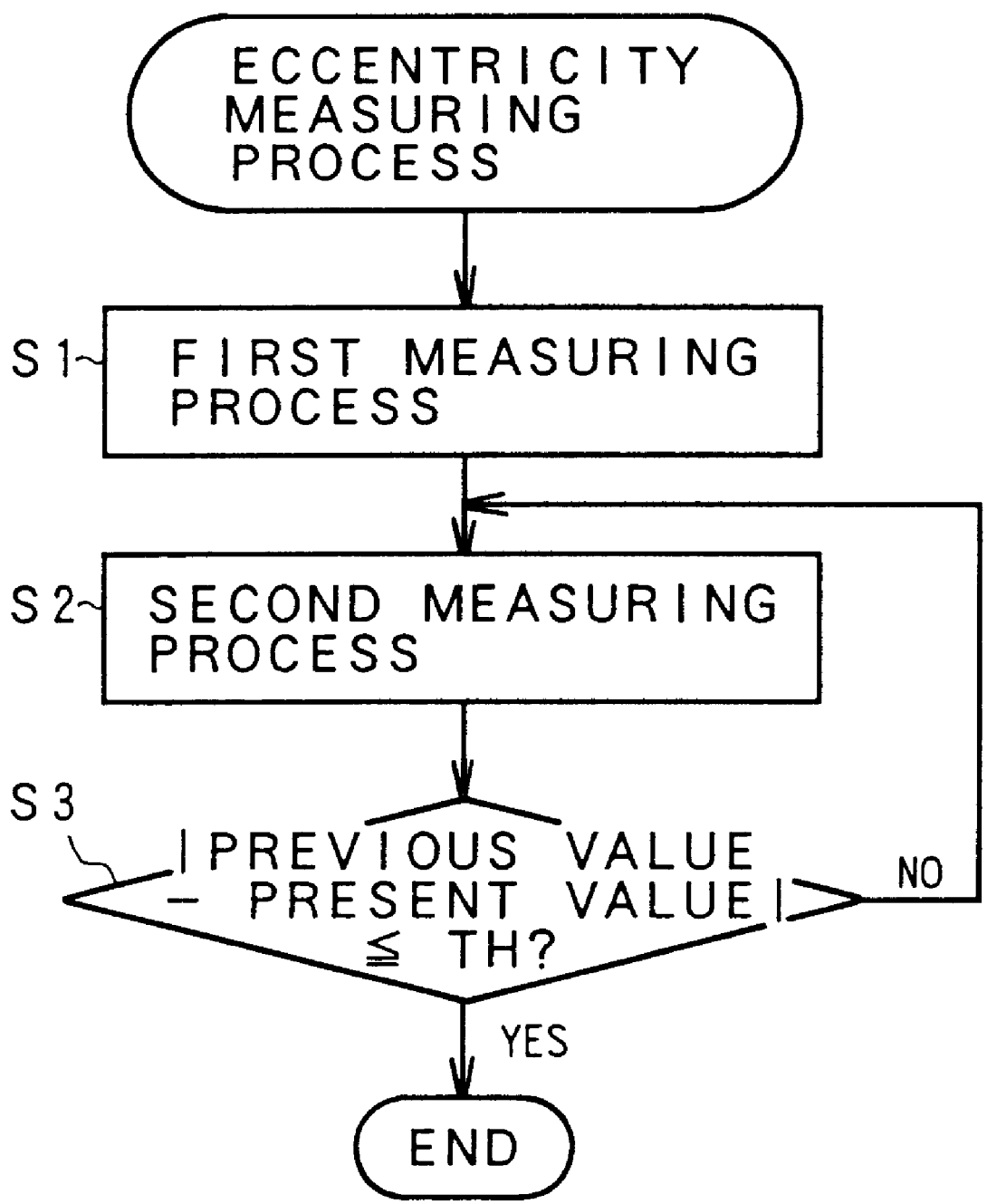

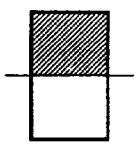
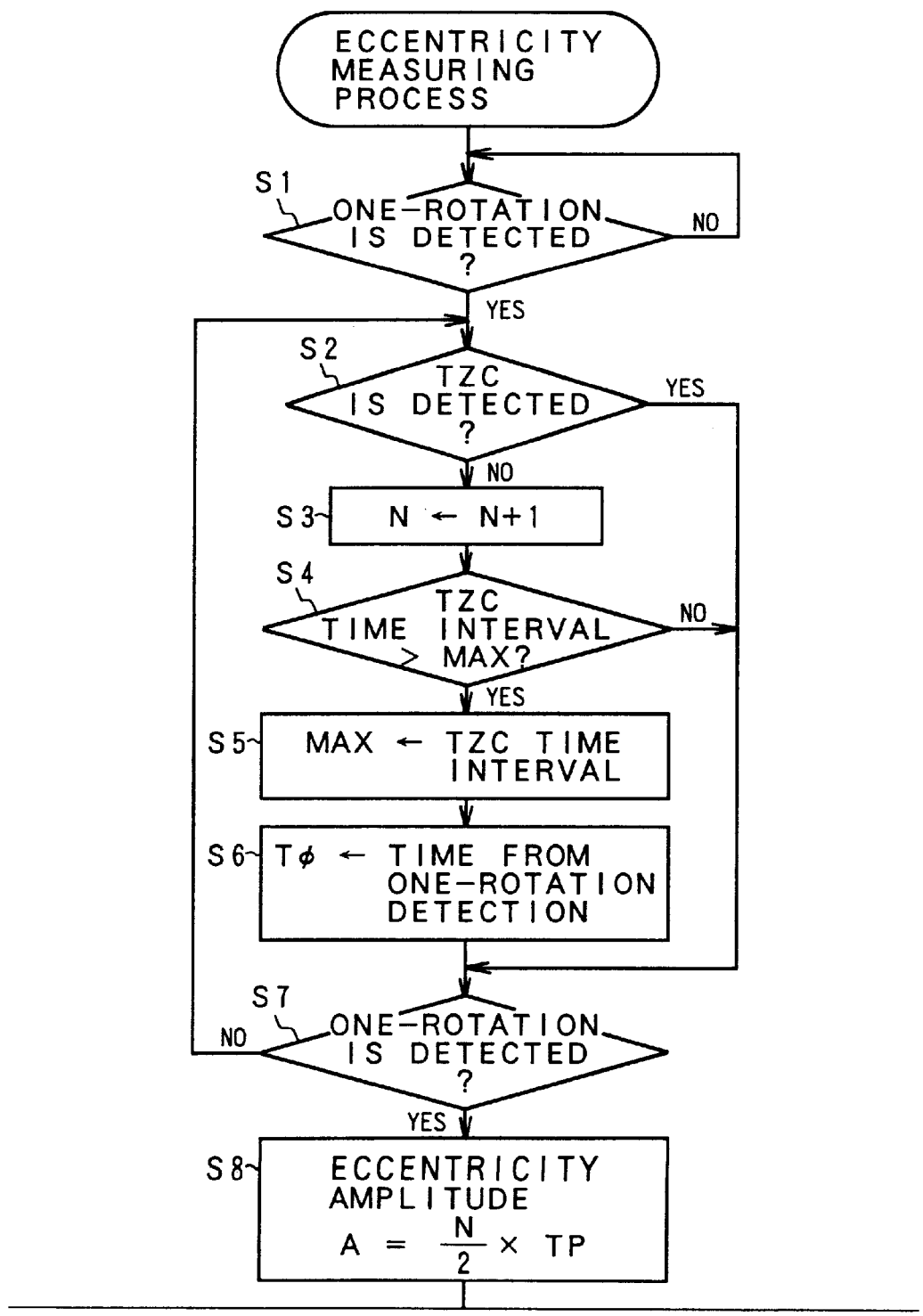
FIG. 16A

FIG. 16B
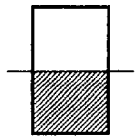
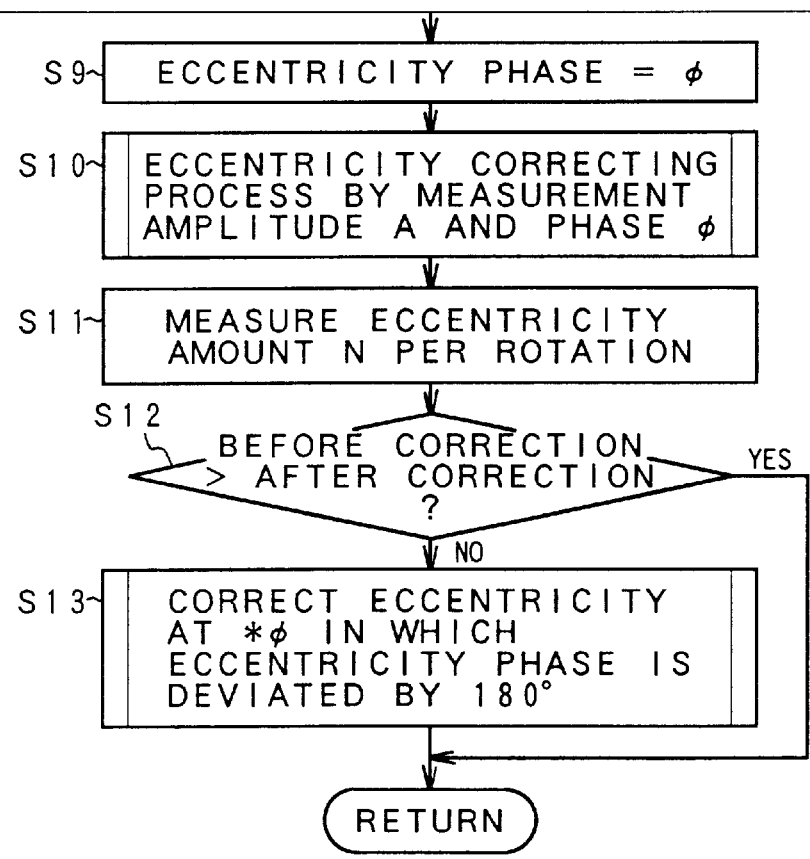

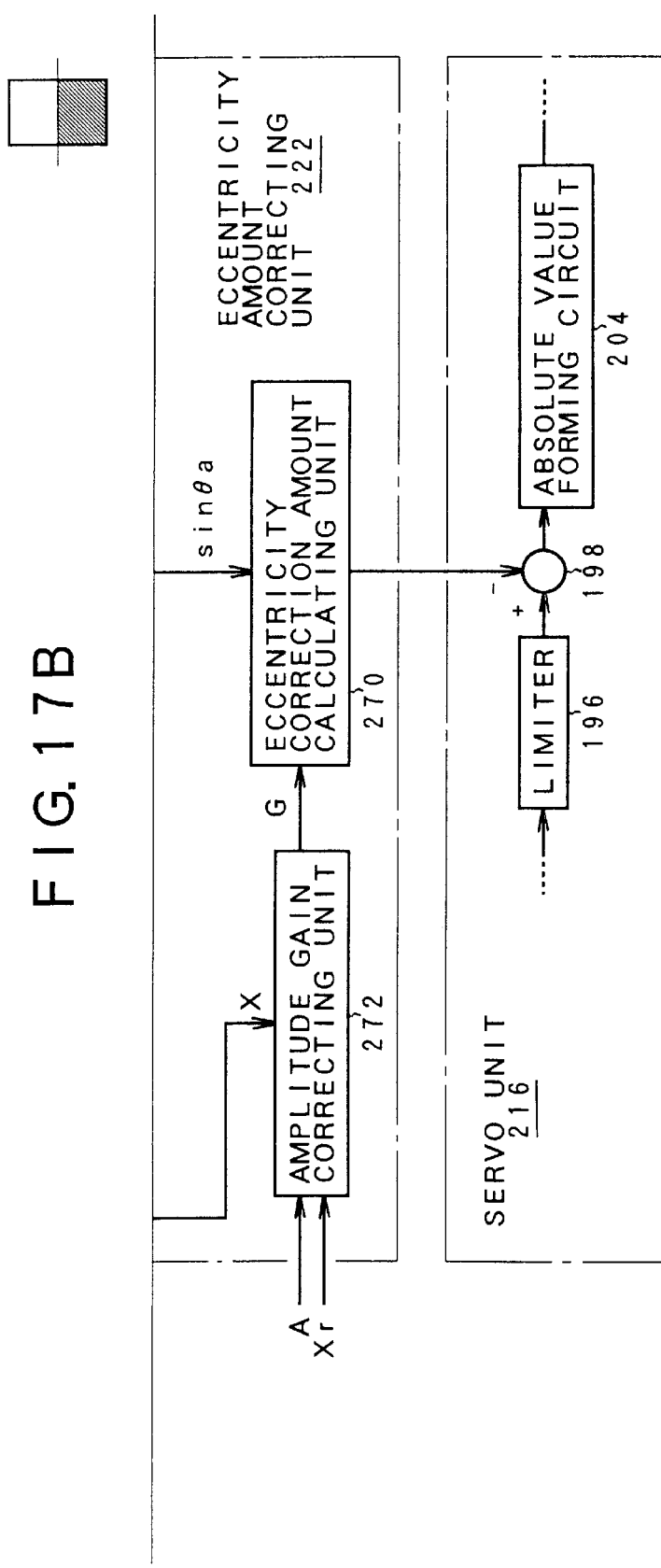

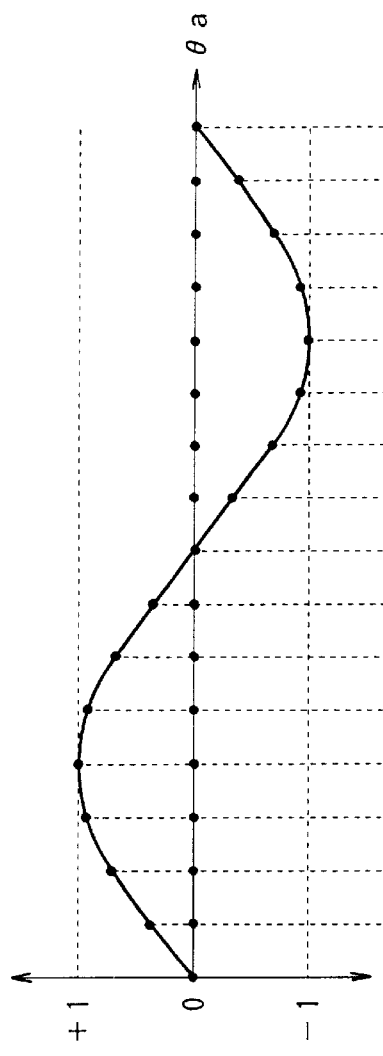
FIG. 18A
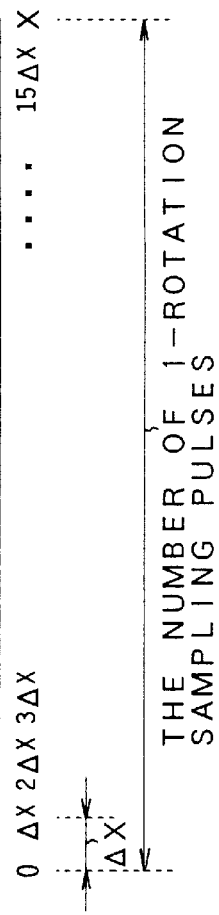
FIG. 18B
ECCENTRICITY MEMORY 200
ADDRESS a
FIG. 18C
THE NUMBER OF SAMPLING PULSES cnt

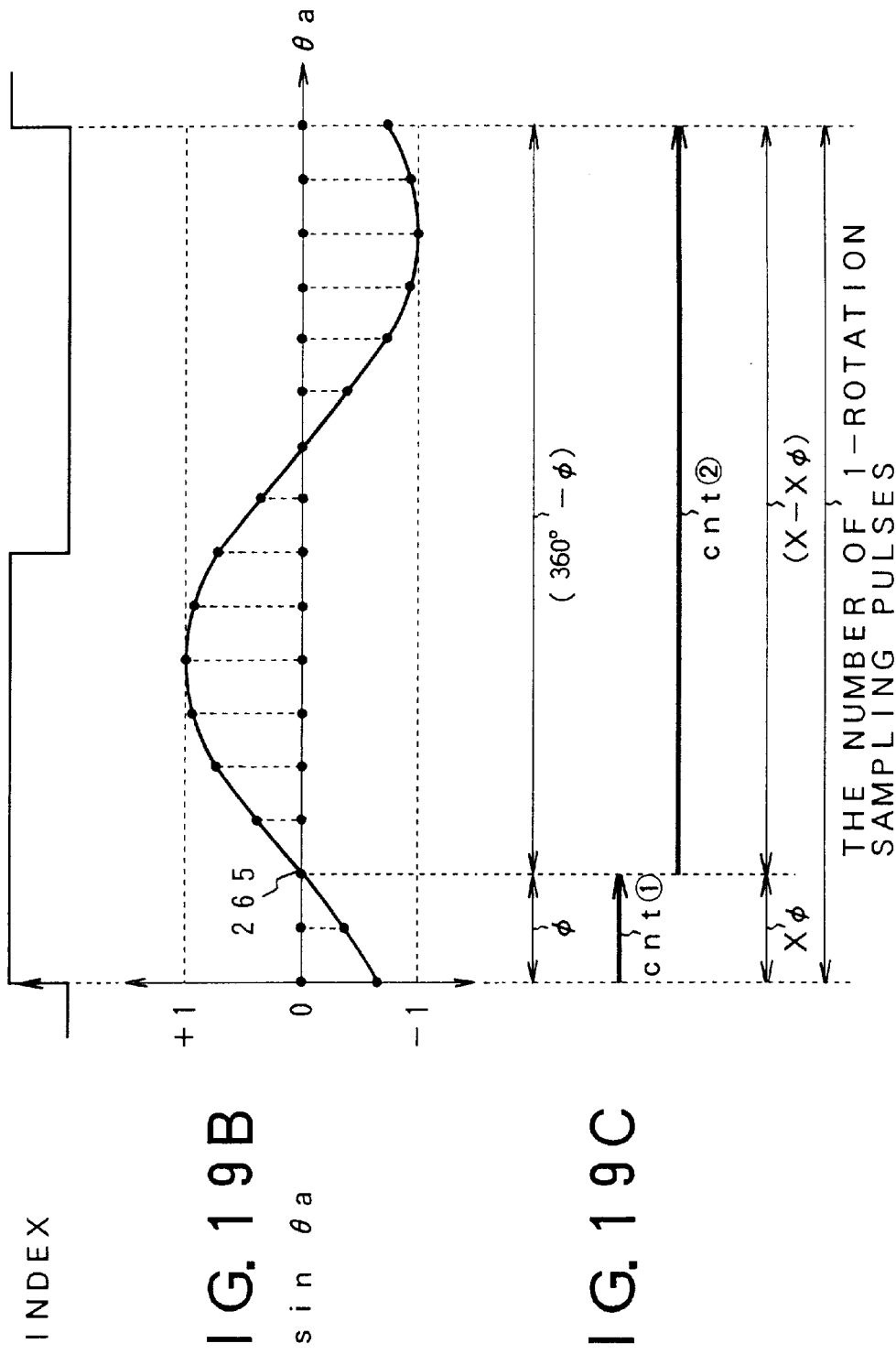

OPTICAL STORAGE APPARATUS

BACKGROUND OF THE INVENTION

The present invention relates to an optical storage apparatus using an exchangeable medium such as CD, MO cartridge, or the like and, more particularly, to an optical storage apparatus for variably controlling a medium rotational speed for a constant linear velocity (CLV) and simultaneously correcting an eccentricity by using an eccentricity memory when a CD is reproduced.

Attention is paid to an optical disk as a storage medium as a center of multimedia which has rapidly been developing in recent years. For example, as for an MO cartridge of 3.5 inches, in addition to conventional MO cartridges of 128 MB and 230 MB, media of a high density recording such as MO cartridges of 540 MB and 640 MB and, further, a medium of a direct overwriting type are also being provided in recent years. As an optical disk drive, therefore, it is desirable that various media of 128 MB, 230 MB, 540 MB, and 640 MB, and further of the direct overwriting type which can be obtained at present can be used. In recent years, in personal computers which have rapidly been spread, a function for reproducing a compact disc (CD) which is known as a read only disk is indispensable. It is difficult to mount an optical disk drive of an MO cartridge as an exchangeable optical disk drive in addition to an optical disk drive for a CD from a viewpoint of a space and costs. In recent years, therefore, an optical disk drive which can use both of the MO cartridge and the CD has also been developed. According to the optical disk drive of the CD/MO compatible type, with respect to an optical system, a mechanism structure, and a controller circuit unit, a common use for both of a CD and an MO cartridge is realized as much as possible. Further, in recent years, a digital video disk (DVD) is also started to be spread and a common use for both of a DVD and an MO cartridge is also realized as much as possible in a manner similar to the CD.

SUMMARY OF THE INVENTION

In an optical disk drive using exchangeable media such as MO, CD, DVD, and the like, since a track eccentricity amount of a loaded medium is different every medium, the eccentricity amount of the medium is measured at a stage of an initializing process after the medium was loaded and an eccentricity offset current is supplied to a VCM synchronously with a medium rotation so as to set off the measured eccentricity amount. When tracks are regarded as straight lines, since the medium eccentricity draws a sine curve, what is called an eccentricity memory such as an RAM in which a sine value in which a rotational angle of a predetermined resolution is used as an address has preliminarily been stored is prepared, the eccentricity amount is obtained by reading out a corresponding cosine value from the eccentricity memory synchronously with an actual rotating position of the medium from an amplitude measured as eccentricity information and a phase for a rotational reference position, and an offset current is supplied so as to set off the eccentricity amount. In this case, in the MO cartridge, since the medium rotational speed is always constant owing to the constant angular velocity (CAV), it is sufficient to prepare one kind of eccentricity memory in which a sine value at each position in which the rotating position is used as an address has been stored.

In the media of a CD, a DVD, and the like, however, since a constant linear velocity (CLV) is used, the medium rotational speed has to be changed in order to keep a linear velocity constant in accordance with a position of an access track in the radial direction of the medium. When the rotational speeds are different in the radial direction of the medium as mentioned above, a time which is required for one rotation of the medium (rotational period) is also changed according to the rotational speed. A width of one address of the eccentricity memory has a value obtained by dividing the time required for one rotation by the number of addresses and the width of one address is changed depending on the rotational speed of the medium. Therefore, a plurality of kinds of eccentricity memories have to be prepared in accordance with the change in rotational speed of the medium and a capacity of the eccentricity memory is extremely large, resulting in a cause of disturbing a reduction in costs of the apparatus. Each time the medium rotational speed changes, different eccentricity memories have to be accessed, so that the number of accessing times of the memory also increases, resulting in an obstacle in realization of a high processing speed.

According to the invention, there is provided an optical storage apparatus which can efficiently correct an eccentricity by an access of an eccentricity memory of one kind even if a medium rotational speed is changed for a constant linear velocity (CLV).

According to an optical storage apparatus of the invention, a light beam from an optical unit is moved to a target track and is on-tracked by an access control unit provided for an MPU or the like by a driving control of a positioner using a VCM for moving a lens to irradiate the light beam onto a medium in the direction traversing medium tracks, and the optical storage apparatus further has a linear velocity control unit for variably controlling a rotational speed of the medium by a spindle motor in accordance with a radial position of the medium so as to set a linear velocity in the circumferential direction at the irradiating position of the light beam to a constant value. According to the invention, the optical storage apparatus is characterized by comprising: an eccentricity measuring unit for measuring an eccentricity amplitude (A) of one rotation of the medium and an eccentricity phase $\phi$ for a start position of one rotation; an eccentricity memory in which an area from the start position of one rotation of the medium to an end position is divided into a plurality of regions every predetermined rotational angle and addresses are sequentially allocated and a sine value of each rotational angle increased by every predetermined rotational angle is stored in each address; a read control unit for generating an address (a) in the eccentricity memory corresponding to the rotating position of the medium where the light beam is irradiated at present by using the start position of one rotation of the medium as a reference and for reading out a corresponding sine value $\sin\theta a$ from the eccentricity memory by a designation of the address (a); and an eccentricity correcting unit for obtaining an eccentricity amount (L) on the basis of the sine value read by the read control unit and the measurement values measured by the eccentricity measuring unit and for controlling the positioner so as to set off the eccentricity amount (L). Consequently, it is sufficient to use one kind of eccentricity memory. Even when the medium rotational speed differs depending on the reproducing position in the medium radial direction because of the constant linear velocity (CLV), the sine value in the eccentricity memory corresponding to the present rotating position of the medium when the light beam is irradiated at present can be read out by accessing the eccentricity memory of one kind. A memory capacity of the eccentricity memory can be remarkably reduced and costs of the apparatus can be reduced.

The read control unit has: a rotational period detecting unit for detecting a medium rotational period (medium rotational speed) according to the position in the radial direction of the medium where the light beam is irradiated at present; a 1-address rotating time detecting unit for detecting a 1-address rotating time showing a medium rotating time of one address by dividing the rotational period by the number of addresses in the eccentricity memory; a medium present position detecting unit for detecting a medium present position showing the rotating position of the medium where the light beam is irradiated at present by using the start position of one rotation of the medium as a reference; and a memory reading unit for comparing an address upper limit value of the present read address in the eccentricity memory expressed by the 1-address rotating time with the present position of the medium where the light beam is irradiated at present, when the medium present position is less than the address upper limit value, for designating the same address (a), for reading out the sine value from the eccentricity memory, and when the medium present position reaches the address upper limit value, for updating to the address by adding "1" to the present address, and for reading out the sine value from the eccentricity memory.

More specifically, the rotational period detecting unit detects the number (X) of rotational period pulses showing the medium rotational period according to the position in the radial direction of the medium where the light beam is irradiated at present by counting sampling clock pulses of a predetermined frequency for one rotation of the medium. The 1-address rotating time detecting unit detects the number $\Delta x$ of 1-address rotational pulses showing the medium rotating time of one address obtained by dividing the number (X) of rotational period pulses by the number (C) of addresses in the eccentricity memory. The medium present position detecting unit repeats the counting operation of the sampling clock pulses by using the start position of one rotation as a reference and detects the number cnt of pulses of the medium present position showing the medium rotating position where the light beam is positioned at present.

Further, the memory reading unit compares an address upper limit value $\Delta X(a+1)$ of the present read address (a) in the eccentricity memory expressed by the number $\Delta X$ of 1-address rotating pulses with the number cnt of pulses of the medium present position where the light beam is irradiated at present, and I. when the number cnt of pulses of the medium present position is less than the address upper limit value, that is, when $\{cnt<\Delta X(a+1)\}$, the same address (a) is designated and the sine value is read out from the eccentricity memory, and II. when the number cnt of pulses of the medium present position reaches the address upper limit value, that is, when $cnt=\Delta X(a+1)$, the address is updated to an address $a=a+1$ by adding "1" to the present address (a) and the sine value is read out from the eccentricity memory.

When detecting the number cnt of medium present position pulses indicative of the medium rotating position where the light beam is located at present, the medium present position detecting unit corrects the number cnt of medium present position pulses to a value without the eccentricity phase $\phi$ on the basis of the eccentricity phase $\phi$ obtained by the eccentricity measuring unit. Specifically speaking, the medium present position detecting unit converts the eccentricity phase $\phi$ measured by the eccentricity measuring unit to the number $X\phi$ of eccentricity phase pulses expressed by a count value of the sampling clock pulses. When the number cnt of medium present position pulses is equal to or larger than 0 and is smaller than the number $X\phi$ of eccentricity phase pulses ($0 \leq cnt < X\phi$), the value of cnt is corrected as follows.

$$cnt=(X-X\phi)+cnt \tag{1}$$

When the number cnt of medium present position pulses is equal to or larger than the number $X\phi$ of eccentricity phase pulses and is smaller than the number (X) of rotational period pulses ($X\phi \leq cnt < X$), the value of cnt is corrected as follows.

$$cnt=cnt-X\phi \tag{2}$$

This phase correction indicates that the count value cnt of the medium present position pulses is corrected to a value corresponding to the address (a) of the eccentricity memory having no eccentricity phase.

The read control unit further has a linear interpolating unit for, when the medium present position where the light beam is irradiated at present is located in a portion within a predetermined rotational angle corresponding to the address (a) in the eccentricity memory, detecting a sine value of the medium present position by a linear interpolation of a sine value read from the eccentricity memory.

The linear interpolating unit designates the address (a) to which, for example, the medium present position where the light beam is irradiated at present belongs, reads out a sine value $sin\theta a$ from the eccentricity memory and obtains a sine value which was linear interpolated by the following equation when it is assumed that a rotational angle of one address is set to $\Delta\theta$ and the number of pulses in one address indicative of a position in one address is set to (b).

$$sin\theta a=sin\theta a+sin\Delta\theta \cdot (b/\Delta X) \tag{3}$$

When assuming that the sine value read by the read control unit is set to $sin\theta a$ and the eccentricity amplitude measured by the eccentricity measuring unit is set to A, the eccentricity correcting unit calculates an eccentricity amount (L) by the following equation.

$$L=A \cdot sin\theta a \tag{4}$$

When it is assumed that a rotational period at a reference position in the medium radial direction is set to the reference number Xr of rotational period pulses expressed by the count value of the clock pulses and the number of rotational period pulses indicative of a rotational period at a position in the medium radial direction where the light beam is located at present is set to (X), the eccentricity correcting unit corrects the eccentricity amplitude (A) to $$A=A/(X/Xr)^4 \tag{5}$$

and calculates the eccentricity correction amount (L).

That is, the eccentricity amplitude (A) is corrected so as to be inversely proportional to the square of a change amount from the reference rotational speed. For example, when the present rotational speed increases to a speed that is twice as fast as the reference rotational speed, the eccentricity amplitude (A) is corrected to ¼. It is now assumed that the VCM is used for correcting the eccentricity, an accelerating performance of the VCM is set to G, an angular frequency of the medium rotation is set to $\omega$, and an amplitude of an acceleration current for eccentricity correction is set to Ia. In this case, since the eccentricity amount (L)

is equal to an amount corresponding to the integration of two times of an acceleration (G•Ia•sinωt), $$L = (G^{*}Ia/\omega 2) \sin \omega t \quad (6)$$

Where, the eccentricity amplitude A=G•La/ω2.

Therefore, the eccentricity amount (L) is inversely proportional to the square of the rotational speed. Therefore, since the eccentricity amount (L) of (ωt=θa) at arbitrary time (t) is constant, an optimum eccentricity correction can be performed to an arbitrary rotational speed by multiplying the right side of the expression (6) by a correction coefficient {1/(X/Xr)²} which is inversely proportional to the square of a change amount from the reference rotational speed. In this case, when a change in the number (X) of rotational period pulses at a position in the medium radial direction where the light beam is located at present is larger than the reference number Xr of rotational period pulses, the eccentricity correcting unit corrects the amplitude gain (G).

When the rotational period successively changes every rotation by controlling the light beam so as to be positioned on a medium track formed in a spiral shape, the read control unit obtains parameters necessary for reading out the eccentricity memory with respect to the first medium track and, after that, proportionally changes each parameter on the basis of the change in rotational period of one track, and performs the read control of the eccentricity memory. For example, when the rotational period successively changes every rotation by controlling the light beam so as to be positioned on the medium track formed in a spiral shape, the read control unit detects the number (X) of rotational period pulses by counting the sampling clock pulses with respect to the first medium track. After that, the read control unit changes the number (X) of rotational period pulses by every number of changed pulses of the rotational period of one track, thereby executing the read control of the eccentricity memory. Consequently, when the medium rotational speed successively changes, it is unnecessary to actually detect the rotational period after the second rotation and it is necessary to wait for a time of one rotation of the medium at most in order to actually measure the rotational period, so that a processing time can be reduced.

When the light beam is sought to the target track by an access control unit, prior to the start of the seeking operation, the rotational speed is changed to a rotational speed at which the linear velocity at a target track is made constant by the linear velocity control unit, a measuring process by the eccentricity measuring unit is performed in this state, and after that, the light beam is sought to the target track. As another form of the eccentricity correction upon seeking, when the light beam is sought to the target track by the access control unit, after the light beam was sought to the target track, the linear velocity control unit changes the rotational speed to a speed at which the linear velocity at the target track is made constant. In this state, the measuring process by the eccentricity measuring unit is performed. The medium rotational speed at which the linear velocity when the light beam is sought to the target track is constant is given from an upper apparatus.

Before the medium is loaded into the apparatus and the apparatus enters a ready state, the eccentricity measuring unit measures eccentricity information in a specific zone or an arbitrary zone of the medium. At this time, the eccentricity measuring unit measures the eccentricity amplitude (A) and eccentricity phase φ on the basis of a zero-cross point detection of a tracking error signal corresponding to a position in the direction in which the light beam formed on the basis of a photosensitive output of a medium return light obtained by the optical unit crosses the track in a state in which the driving operations of the carriage and lens are stopped. The eccentricity measuring unit obtains the eccentricity amplitude (A) by multiplying a track pitch to the half of the number (N) of zero-cross points of the tracking error signal of one rotation of the medium obtained by synchronizing with a rotation detection signal (index signal) indicative of one rotation of the medium and obtains a time required from a start position of one rotation of the rotation detection signal to a middle point of the maximum zero-cross point interval time of the tracking error signal as an eccentricity phase φ. The eccentricity measuring unit measures the number of zero-cross points of one rotation in an eccentricity correcting state by the eccentricity correcting unit based on the measured eccentricity information and, when the number of zero-cross points by the eccentricity correction exceeds the number of zero-cross points upon measuring, corrects the eccentricity phase φ obtained by the measuring process to an inverse phase. In this case, the eccentricity measuring unit corrects the phase to an eccentricity inverse phase (φ+180°) obtained by adding the ½ rotational angle to the measured phase φ as an inverse phase. Further, the eccentricity measuring unit executes the measurement of the eccentricity information and the eccentricity correction after the measurement two times, respectively, and compares the numbers of zero-cross points of one rotation after the eccentricity correction. When a difference as a comparison result exceeds a predetermined threshold value, the eccentricity measuring unit repeats the measurement and correction of the eccentricity until the difference is equal to or less than the threshold value.

The above and other objects, features, and advantages of the present invention will become more apparent from the following detailed description with reference to the drawings.

BRIEF DESCRIPTION OF THE DRAWINGS

FIGS. 1A and 1B are block diagrams of an optical disk drive according to the invention;

FIG. 5 is an explanatory diagram of an ON/OFF operation of a servo control of an analog switch in FIGS. 4A and 4B;

FIG. 6 is an explanatory diagram of a servo control mode in FIG. 5;

FIG. 7 is a block diagram of an eccentricity measurement correcting function of the invention which is realized by an MPU and the DSP in FIGS. 1A and 1B;

FIGS. 12A to 12C are time charts of a tracking error signal, an index signal, and a VCM current at the time of the eccentricity measurement;

FIGS. 13A to 13C are time charts of the tracking error signal, index signal, and VCM current at the time of the eccentricity correction using the eccentricity measurement results;

FIGS. 14A to 14C are time charts of the tracking error signal, index signal, and VCM current by the eccentricity correction when an eccentricity phase is inverted;

FIG. 15 is a schematic flowchart for a measuring process by an eccentricity measuring unit in FIGS. 5A and 5B;

FIGS. 16A and 16B are detailed flowcharts for the eccentricity measuring process in FIG. 15;

FIGS. 17A and 17B are functional block diagrams of a read control unit and an eccentricity amount correcting unit in FIGS. 5A and 5B;

FIGS. 18A to 18C are explanatory diagrams of an eccentricity memory in FIG. 7;

FIGS. 19A to 19C are explanatory diagrams of the eccentricity phase and a memory address correction;

DETAILED DESCRIPTION OF THE PREFERRED EMBODIMENTS

Apparatus Construction

Figure 1B:
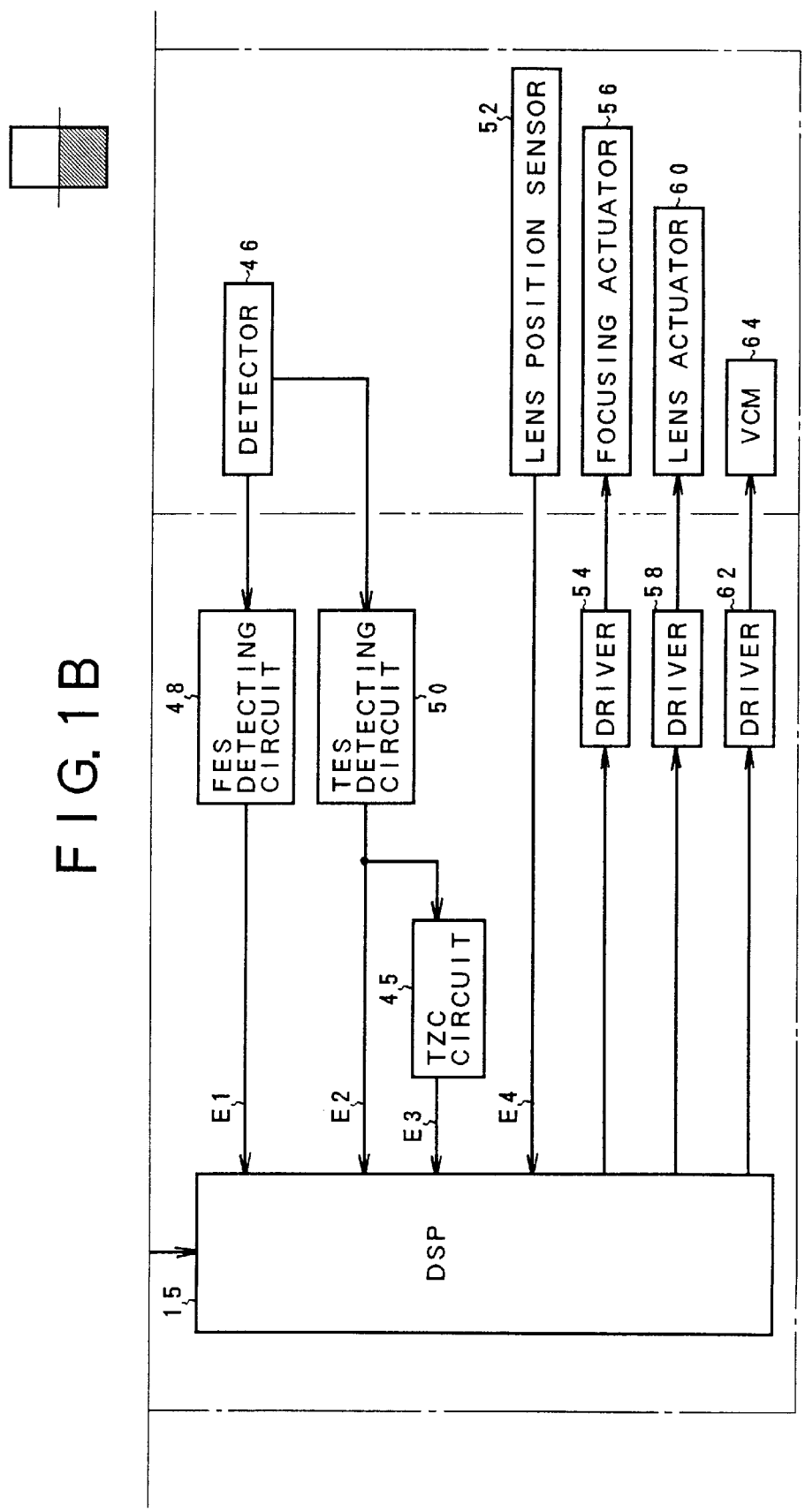

FIGS. 1A and 1B are circuit block diagrams of an optical disk drive as an optical storage apparatus of the invention. The optical disk drive of the invention comprises a controller 10 and an enclosure 12. The controller 10 has: an MPU 14 for performing a whole control of the optical disk drive; an interface controller 16 for transmitting and receiving commands and data to/from an upper apparatus; an optical disk controller 18 for executing processes necessary to write or read data to/from an optical disk medium; and a buffer memory 20 which is commonly used by the MPU 14, the interface controller 16, and optical disk controller 18. As a writing system, an encoder 22 and a laser diode control circuit 24 are provided for the optical disk controller. A control output of the laser diode control circuit 24 is supplied to a laser diode 30 provided for an optical unit on the enclosure 12 side. As an optical disk to be recorded and reproduced by using the laser diode 30, namely, as an exchangeable MO cartridge medium, according to the embodiment, any one of the MO cartridge media of 128 MB, 230 MB, 540 MB, and 640 MB and, further, the MO cartridge media of an overwrite supporting type of 540 MB and 640 MB can be used. As for the MO cartridge media of 128 MB and 230 MB among them, a pit position recording (PPM recording) in which data is recorded in correspondence to the presence or absence of a mark on the medium is used. On the other hand, as for the MO cartridge media of 540 MB and 640 MB of a high density recording, a pulse width recording (PWM recording) in which edges, namely, a front edge and a rear edge of a mark are made correspond to data is used. In this instance, a difference of storage capacities between 640 MB and 540 MB depends on a difference of sector capacities. When the sector capacity is equal to 2 kB, the storage capacity is equal to 640 MB. On the other hand, when the sector capacity is equal to 512 B, the storage capacity is equal to 540 MB.

As mentioned above, the optical disk drive of the invention can cope with the MO cartridge of each storage capacity of 128 MB, 230 MB, 540 MB, or 640 MB and, further, the overwrite supporting MO cartridge of 540 MB or 640 MB. Therefore, when the MO cartridge is loaded into the optical disk drive, an interval of an ID portion of the medium is first measured from a signal indicative of the existence of a pit, the kind of medium is recognized by the MPU 14 from the ID interval, and the kind result is notified to the optical disk controller 18. In case of the medium of 128 MB or 230 MB, a formatting process corresponding to the PPM recording is performed. In case of the medium of 540 MB or 640 MB, a formatting process according to the PWM recording is performed.

As a reading system for the optical disk controller 18, a decoder 26 and a read LSI circuit 28 are provided. A photosensitive signal of a return light of a beam from the laser diode 30 by a detector 32 provided in the enclosure 12 is inputted as an ID signal and an MO signal to the read LSI circuit 28 through a head amplifier 34. In the read LSI circuit 28, circuit functions such as AGC circuit, filter, sector mark detecting circuit, synthesizer, PLL, and the like are provided. A read clock and read data are formed by the inputted ID signal and MO signal and are outputted to the decoder 26. Since the zone CAV is used as a recording system of the medium by a spindle motor 40, a switching control of a clock frequency corresponding to the zone is performed to the synthesizer built in the read LSI circuit 28 by the MPU 14. A modulating system of the encoder 22 and a demodulating system of the decoder 26 are switched in accordance with the kind of medium by the optical disk controller 18. That is, they are switched to the modulating and demodulating systems of the PPM recording in case of the media of 128 MB and 230 MB. On the other hand, they are switched to the modulating and demodulating systems of the PWM recording in case of the media of 540 MB and 640 MB.

A detection signal of a temperature sensor 36 provided on the enclosure 12 side is supplied to the MPU 14. The MPU 14 controls each of the reading, writing, and erasing light emitting powers in the laser diode control circuit 24 to an optimum value on the basis of an environment temperature in the apparatus detected by the temperature sensor 36. The MPU 14 controls the spindle motor 40 provided on the enclosure 12 side by a driver 38. Since the recording and reproducing operations of the MO cartridge are performed by the zone CAV, the spindle motor 40 is rotated at a predetermined velocity of, for example, 3600 rpm. The MPU 14 also controls an electromagnet 44 provided on the enclosure 12 side through a driver 42. The electromagnet 44 is arranged on a side opposite to the beam irradiating side of the MO cartridge loaded in the apparatus and supplies an external magnetic field to the medium upon recording and erasing.

A DSP 15 realizes a servo function for positioning a beam from the laser diode 30 to the medium. For this purpose, a 2-split detector 46 for receiving the light of a beam mode from the medium is provided for the optical unit on the enclosure 12 side. An FES detecting circuit (focusing error signal detecting circuit) 48 forms a focusing error signal E1 from a photosensitive output of the 2-split detector 46 and supplies to the DSP 15. A TES detecting circuit (tracking error signal detecting circuit) 50 forms a tracking error signal E2 from a photosensitive output of the 2-split detector 46 and supplies to the DSP 15. The tracking error signal E2 is inputted to a TZC circuit (track zero-cross point detecting circuit) 45 and a track zero-cross pulse E3 is formed and inputted to the DSP 15. Further, a lens position sensor 52 for detecting the position of an objective lens to irradiate a laser beam to the medium is provided on the enclosure 12 side. The sensor 52 inputs a lens position detection signal (LPOS) E4 to the DSP 15. In order to position the beam, the DSP 15 controls a focusing actuator 56, a lens actuator 60, and a VCM 64 through drivers 54, 58, and 62.

Figure 2:
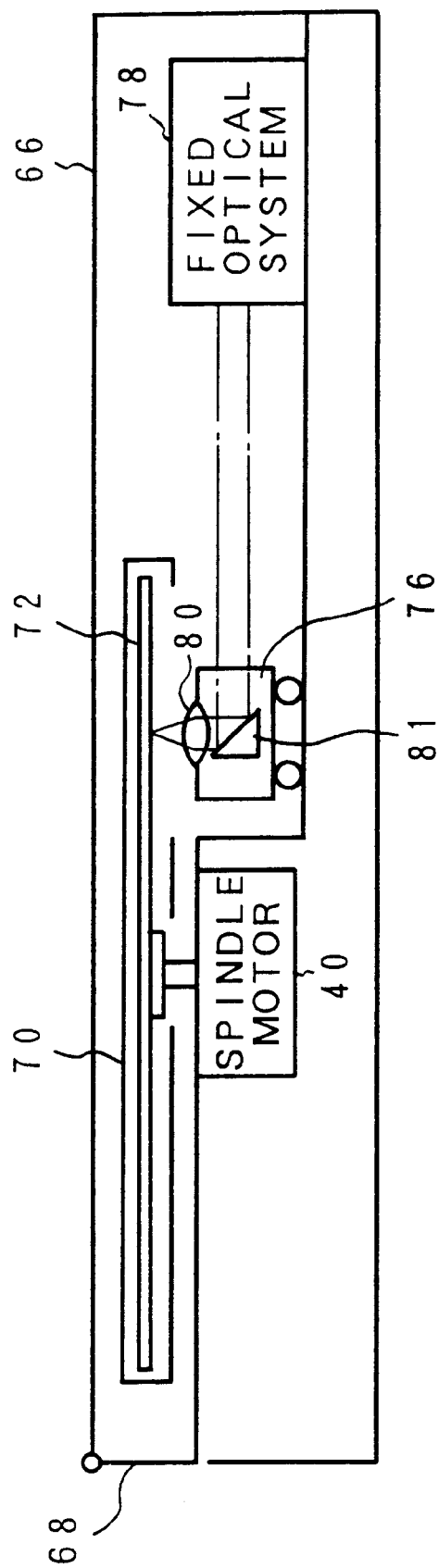
FIG. 2 is a schematic explanatory diagram of an apparatus structure of the invention using an MO cartridge.

The enclosure in the optical disk drive is schematically shown in FIG. 2. The spindle motor 40 is provided in a housing 66. A loading operation is performed in a manner such that by inserting an MO cartridge 70 from the side of an inlet door 68 to a hub of a rotational axis of the spindle motor 40, an MO medium 72 in the cartridge 70 is attached to the hub of the rotational axis of the spindle motor 40. A carriage 76 which is movable in the direction traversing the medium tracks by the VCM 64 is provided under the MO medium 72 of the loaded MO cartridge 70. An objective lens 80 is mounted on the carriage 76 and a beam from a semiconductor laser provided for a fixed optical system 78 enters the lens through a prism 81, thereby forming a beam spot onto the surface of the MO medium 72. The objective lens 80 is moved in the optical axial direction by the focusing actuator 56 shown in the enclosure 12 in FIG. 1 and can be moved within a range of, for example, tens of tracks in the radial direction traversing the medium tracks by the lens actuator 60. A position of the objective lens 80 mounted on the carriage 76 is detected by the lens position sensor 52 in FIG. 1. The lens position sensor 52 sets the lens position detection signal to 0 at a neutral position where the optical axis of the objective lens 80 is directed right overhead and outputs the lens position detection signal E4 corresponding to movement amounts of different polarities for the movement to the outer side and the movement to the inner side.

Figure 3:
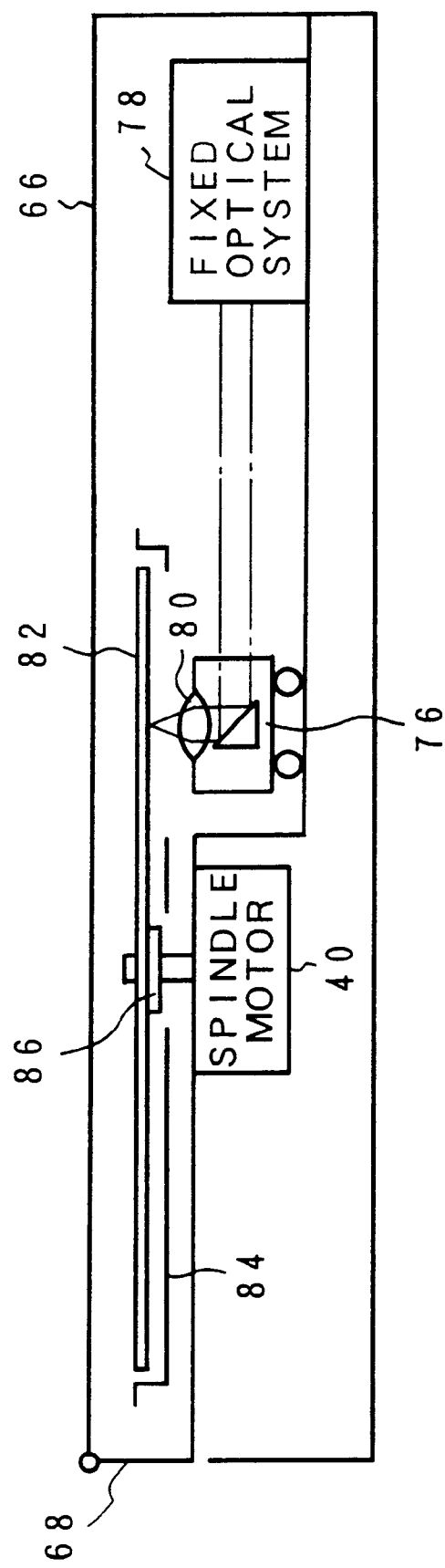
FIG. 3 is a schematic explanatory diagram of an apparatus structure of the invention using a CD.
Figure 4A:
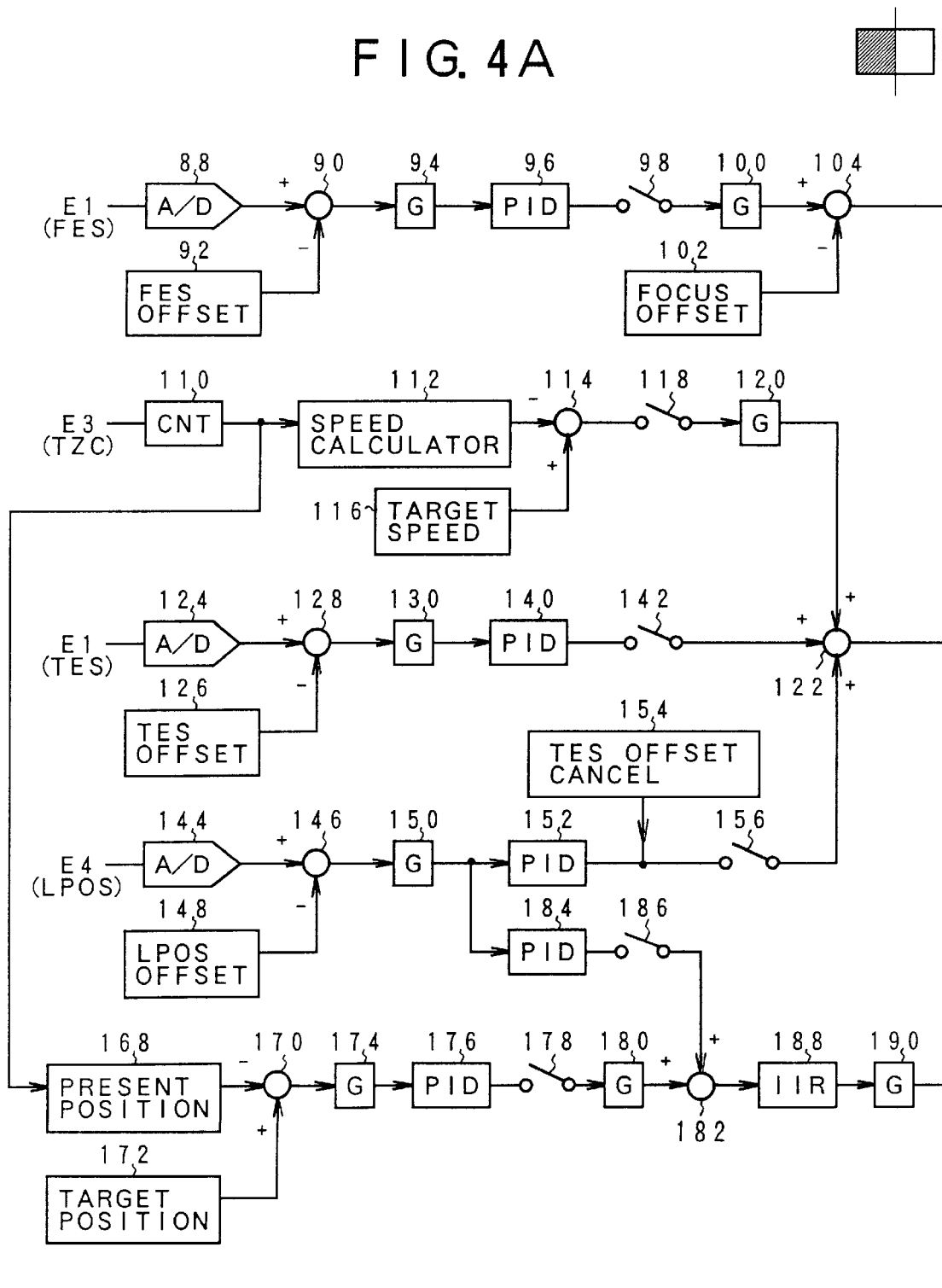
FIGS. 4A and 4B are functional block diagrams of a servo unit which is realized by a DSP in FIGS. 1A and 1B.
Figure 4B:
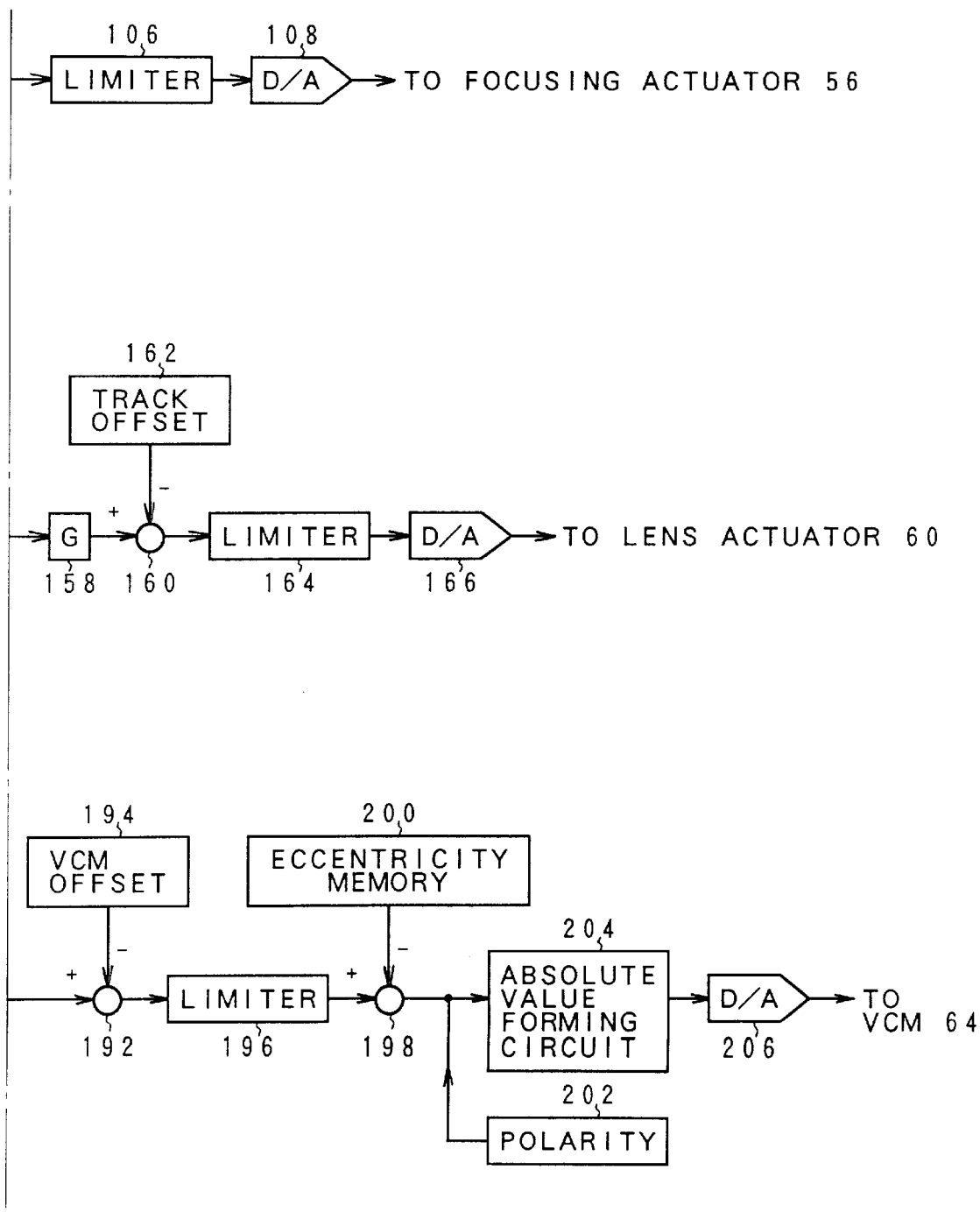

In the optical disk drive of the invention, in addition to the MO cartridge, a read only CD can also be used as an optical disk medium. FIG. 3 shows a state in which a CD is loaded in place of the MO cartridge 70 of FIG. 2. In case of using the CD, in the embodiment, a CD medium 82 is put on a prepared tray 84 and is loaded into the housing 66 from the inlet door 68. The tray 84 has a turntable 86 to previously attach the CD medium 82 to the spindle motor 40. Therefore, the CD medium 82 is put onto the tray 84 so that the hole of the center portion of the CD medium 82 is fitted on the turntable 86 and is loaded into the optical disk drive. As a turntable 86 used for the tray 84, there is used a turntable constructed in a manner such that the CD medium 82 side has the same CD attaching structure as that of the normal CD disk drive corresponding to the center hole of the CD medium 82 and the spindle motor 40 side of the turntable 86 uses the same structure as that of the hub structure which is used in the MO cartridge 70 in FIG. 3. By using such a turntable 86, even the CD medium 82 as an exposed medium having quite different shape dimensions can also be loaded to the spindle motor 40 by using the tray 84 in a manner similar to the MO cartridge 70. In order to cope with the loading of the CD medium 82, in the controller 10 in FIG. 1, when the MPU 14 recognizes that the loaded medium is the CD medium 82, the optical disk controller 18, read LSI circuit 28, and decoder 26 are switched to the circuit function corresponding to the CD. It is also possible to provide a circuit of the reading system only for the CD medium and to switch from the reading system for the MO cartridge to the reading system for the CD medium. In the CD medium 82, since a medium rotation control by the spindle motor 40 is performed at a constant linear velocity (CLV), the MPU 14 executes a constant linear velocity control (CLV control) in which the rotational speed of the spindle motor 40 is changed in accordance with the track position through the driver 38 so as to set a read clock obtained from the reading system of the CD to a reference constant linear velocity. FIGS. 4A and 4B are functional block diagrams of a focusing servo, a lens servo, and a VCM servo which are realized by the DSP 15 provided in the controller 10 in FIGS. 1A and 1B. First, in the focusing servo system, the focusing error signal E1 is converted to digital data by an A/D converter 88 and is fetched, the digital data is corrected by an FES offset set in a register 92 by an addition point 90, a phase compensation to increase a gain with respect to a predetermined high frequency band is performed by a phase compensator 94, and proportional/integrating and differentiating operations are performed to the focusing error signal by a PID arithmetic operating device 96. Further, after a phase compensation was performed by a phase compensator 100, a focusing offset of a register 102 is compensated by an addition point 104, and the resultant signal is converted to an analog signal by a D/A converter 108 through a limiter 106, thereby outputting a current instruction value to the focusing actuator 56. A servo switch 98 is provided between the PID arithmetic operating device 96 and phase compensator 100, thereby enabling the focusing servo to be on/off controlled.

A lens servo system for the lens actuator 60 will now be described. The lens servo system is divided into three systems of a speed control system, a tracking servo system, and a lens position servo system. First, in the speed control system, the track zero-cross signal E3 is inputted to a counter 110, a time of the track zero-cross interval is obtained by counting the clocks, and a beam speed is obtained by a speed calculator 112. A deviation between an output of the speed calculator 112 and a target speed from a register 116 is obtained by an adder 114 and is subjected to a phase compensation with respect to the speed deviation by a phase compensator 120 through a servo switch 118. After that, the resultant signal is sent to an adder 122. In the tracking servo system of the lens servo, the tracking error signal E2 is converted into digital data by an A/D converter 124 and fetched. A correction of the TES offset set by a register 126 is performed at an addition point 128 and a phase compensation is executed by a phase compensator 130. After that, proportional, integration, and differentiation arithmetic operations are performed by a PID arithmetic operating device 140. After that, the resultant data is supplied to the adder 122 through a servo switch 142. Further, as a lens position servo system, the lens position detection signal E4 is fetched as digital data by an A/D converter 144. A correction of an LPOS offset by a register 148 is performed by an adder 146 and a phase compensation is executed by a phase compensator 150. After that, proportional, integration, and differentiation arithmetic operations are executed by a PID arithmetic operating device 152. The resultant data is supplied to the adder 122 through a servo switch 156. A TES offset cancellation can be added to the input side of the servo switch 156 by a register 154. The speed deviation signal of the speed servo system, the tracking error signal of the tracking servo system, and further the lens position deviation signal of the lens position servo system are added by the adder 122. The resultant signal is subjected to a phase compensation by a phase compensator 158. After that, a correction of a track offset by a register 162 is performed by an adder 160. The resultant signal is subsequently converted into an analog signal by a D/A converter 166 and is outputted to the driver side as a current instruction value for the lens actuator 60.

The servo system of the VCM 64 will now be described. A servo system of the VCM 64 constructs a servo system of a feed-forward control based on a deviation between a target track position upon seeking and the present track position. First, the present position by a register 168 of the beam which was detected by the counter 110 on the basis of the track zero-cross signal E3 is compared with a target track position of a register 172 by an adder 170. A position deviation signal according to the number of remaining tracks for the target track position is formed. An output of the adder 170 is phase compensated by a phase compensator 174. After that, the resultant signal is subjected to a proportional, integration, and differentiation arithmetic operation by a PID arithmetic operating device 176. The resultant signal is further subjected to a phase compensation by a phase compensator 180 through a servo switch 178 and is supplied to an IIR 188 through an adder 182. Moreover, a phase compensation is performed by a phase compensator 190. A correction by a VCM offset by a register 194 is subsequently performed by an adder 192. After that, the resultant signal is sent to an adder 198 through a limiter 196. In the adder 198, an eccentricity of the medium is corrected by the reading from an eccentricity memory 200. The eccentricity correction using the eccentricity memory 200 will be clearly described hereinlater. Different polarities according to the seek in the inner direction and the seek in the outer direction are set by a register 202 to a position deviation signal of the VCM servo which was subjected to the eccentricity correction by the adder 198. Further, an absolute value of the position deviation signal is obtained by an absolute value forming circuit 204 and is converted into an analog signal by a D/A converter 206. The analog signal is converted to a VCM current instruction value by the VCM 64 and is outputted to the driver side. Further, an output of the phase compensator 150 of the lens position servo system provided for the lens servo system is branched and inputted to the adder 182 of the VCM servo system through a PID arithmetic operating device 184 and a servo switch 186. When the objective lens is driven by the lens actuator 60 and the lens is sought in an ON state of the servo switch 186, a lens position deviation signal which is formed by the adder 146 on the basis of the lens position detection signal in this instance is inputted as a position deviation signal to the adder 182 of the VCM position servo system through the PID arithmetic operating device 184 and servo switch 186. Therefore, the VCM 64 controls the position of the carriage so as to set the lens position offset to 0 by the driving of the lens actuator 60. Since the servo control based on the deviation signal of the lens position detection signal by the lens actuator as mentioned above is applied to the servo system of the VCM 64, it is called a double servo. FIG. 5 shows a control mode in the servo system in FIGS. 4A and 4B and the on/off states of the servo switches 98, 118, 142, 156, 178, and 186. The control mode of the servo system is divided into five modes of a focusing off mode, a tracking off mode, a tracking on mode, a fine seek mode, and a position seek mode. Control contents of each mode are as shown in FIG. 6. First, the focusing off mode relates to a state in which the track access by the beam is stopped. By turning off the servo switch 98, the focusing servo is turned off and by turning on only the servo switch 156, the objective lens on the carriage is controlled to the 0 position by the lens actuator 60. In the tracking off mode, the focusing servo is validated by turning on the servo switch 98 and the servo switch 156 is turned on, thereby performing the control to move the objective lens to the 0 position by the lens actuator 60. In the tracking off mode, therefore, only the focusing servo of the beam to the medium can be performed in the stop state of the beam. In the tracking on mode, the focusing servo is validated by turning on the servo switch 98 and the servo switch 142 is turned on, thereby performing the on-track control by the driving of the lens actuator 60 by the tracking error signal. Further, by turning on the servo switch 186, the position servo by the lens position detection signal is applied to the VCM servo system, thereby enabling the VCM offset and the eccentricity offset to be compensated. In the fine seek mode, when the access to the target cylinder is instructed from the upper apparatus, the control to move the beam to the target position is performed by the speed control of the lens actuator 60 and the feed-forward control of the VCM 64. That is, in a state where the focusing servo is validated by turning on the servo switch 98, the speed control of the lens actuator 60 is performed by turning on the servo switch 118. Further, by turning on the servo switch 178, the feed-forward control according to the deviation between the target track and the present track position is executed. By further turning on the servo switch 186, a double servo to control the lens to the 0 position by the driving of the VCM 64 is applied on the basis of the position deviation of the lens position signal E4. The position seek mode relates to the lens position control by the lens actuator 60. In a state where the lens is held at the 0 position, the VCM 64 is position controlled so that the beam is moved to the target track by the position deviation signal according to the number of tracks of the present track position for the target track position. That is, by turning on the servo switch 156 in a state where the focusing servo is validated by the turn-on of the servo switch 98, the lens lock for holding the lens at the 0 position is executed by the lens actuator 60. In this state, the carriage is moved by the VCM 64 so as to set the deviation for the target track position to 0 by turning on the servo switch 178. The beam is position controlled to the target track.

Fundamental Function of the Measurement and Correction of Eccentricity Amount

FIG. 7 is a functional block diagram for measuring the eccentricity of the medium and performing the eccentricity correction on the basis of the measurement result in an initializing process after the medium was loaded to the optical disk drive in FIGS. 1A and 1B and is a functional block diagram in case of loading a read only CD medium as shown in FIG. 3. First, an access control unit 210, a linear velocity control unit 212, and an eccentricity measuring unit 214 are provided on the MPU 10 side. The eccentricity memory 200 and a servo unit 216 having functions of FIG. 5, a spindle control unit 218, a read control unit 220, and an eccentricity amount correcting unit 222 are provided on the DSP 15 side. The access control unit 210 allows the light beam from the optical unit to be sought and moved to the target track, thereby on-tracking by the driving control of the positioner using the VCM 64 to move the objective lens for irradiating the light beam onto the CD in the direction traversing the tracks. The linear velocity control unit 212 variably controls the rotational speed of the spindle motor 40 in accordance with the radial position of the CD so that a linear velocity in the circumferential direction at the irradiating position of the light beam on the CD is set to a predetermined value. In a state where the driving of the carriage and the objective lens are stopped, the eccentricity measuring unit 214 measures an eccentricity phase φ, as eccentricity information, for an eccentricity amplitude (maximum eccentricity amount) A of one rotation and the start position of one rotation on the basis of the detection of the zero-cross point of the tracking error signal. In the eccentricity memory 200, a region from the start position of one rotation of the CD to the end position is divided into a plurality of regions of every predetermined rotational angle $\Delta\theta=360°/16=22.5°$ which is determined by an address dividing number (C), for example, C=16 divisions, an address (a) is sequentially allocated as being a=00~15 to those regions, a sine value $\sin\theta a$ (where, $\theta a=0$, $\Delta\theta$, $2\Delta\theta$, ..., $15\Delta\theta$) of every predetermined rotational angle $\Delta\theta$ is stored in each of the addresses a=00–15. On the basis of the start position of one rotation of the CD, the read control unit 220 forms the address (a) in the eccentricity memory 200 corresponding to the rotating position of the CD to which the light beam is irradiated at present and reads out the corresponding sine value $\sin\theta a$ from the eccentricity memory 200 by the designation of the address (a). The eccentricity amount correcting unit 222 obtains an eccentricity amount L on the basis of the sine value $\sin\theta a$ read out by the read control unit 220 and the eccentricity amplitude (A) and eccentricity phase $\phi$ as measurement values measured by the eccentricity measuring unit 214 and controls the positioner, for instance, VCM so as to set off the eccentricity amount (L). Specifically speaking, an eccentricity offset so as to set off the eccentricity amount (L) is given to a current instruction value for the VCM 64 which is inputted to the adder 198 of the output stage of the limiter 196 in the servo system of the VCM 64 in FIGS. 4A and 4B.

Figure 8:
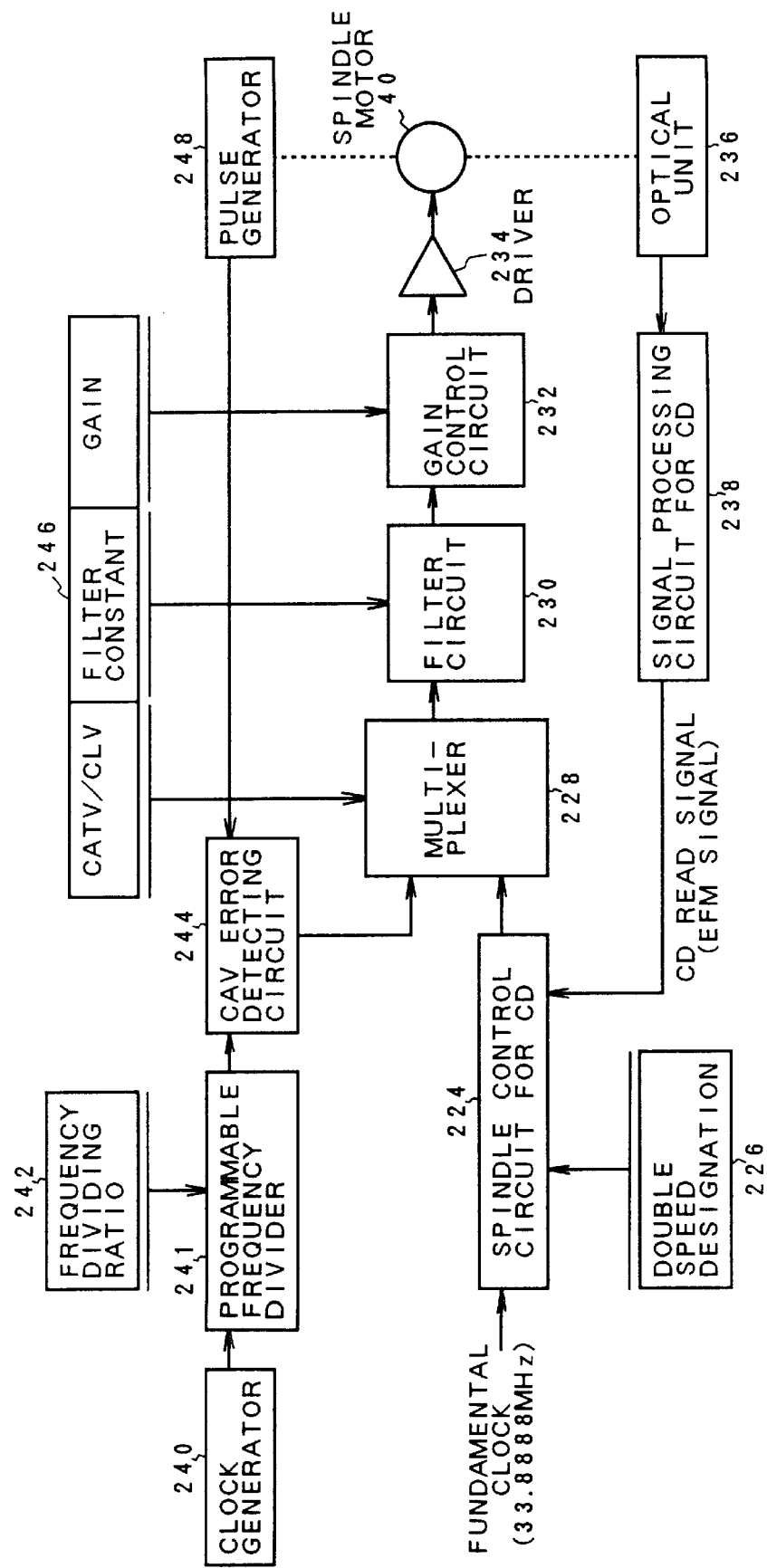
FIG. 8 is a functional block diagram of a spindle control unit in FIG. 5.

FIG. 8 shows the spindle control unit 218 in FIG. 7. The constant angular velocity control (CAV control) which is used for recording and reproduction of the MO cartridge and the constant linear velocity control (CLV control) which is used for reproduction of the CD are executed by selectively switching. First, in order to perform the CAV control, a clock generator 240, a programmable frequency divider 241, a register 242 to set a frequency dividing ratio of the programmable frequency divider 241, and a CAV error detecting circuit 244 are provided. The clock generator 240 generates a clock pulse of a predetermined reference frequency. When the frequency dividing ratio is set by the register 242, the programmable frequency divider 241 generates a target clock pulse which gives a target rotational speed of a frequency obtained by dividing a clock frequency in accordance with the frequency dividing ratio to a CAV error detecting circuit 244. As for the target frequency clock which gives the target speed by the programmable frequency divider 241, the frequency dividing ratio is set and changed by an instruction of the MPU 14 in accordance with a spindle rotational speed of the CAV control that is determined by a recording density of the medium. A rotation detection pulse from a pulse generator 248 provided for the spindle motor 40 is inputted to the CAV error detecting circuit 244. The rotational speed can be also detected from a Hall element or a motor counter electromotive force in place of the pulse generator 248. The CAV error detecting circuit 244 detects a phase difference, as an error, between the target frequency clock (reference speed clock) from the programmable frequency divider 241 and the rotation detection pulse from the pulse generator 248 and outputs it to a filter circuit 230 through a multiplexer 228. After it was subjected to a predetermined gain control by a gain control circuit 232, a current according to the error is supplied to the spindle motor 40 by a driver 234, thereby performing the CAV control.

On the other hand, a spindle control circuit 224 for CD and a register 226 for performing a double speed designation are provided for the purpose of the CLV control. The spindle control circuit 224 for CD compares a frame sync signal of the CD which was demodulated by an optical unit 236 and a signal processing circuit 238 for CD (CD decoder) with a reference frame sync signal obtained by frequency dividing the fundamental clock in accordance with the double speed designation of the register 226 and detects a phase difference. A current according to the error is supplied to the spindle motor 40 by the multiplexer 228, filter circuit 230, gain control circuit 232, and driver 234, thereby performing the constant linear velocity control (CLV control). In case of the standard speed designation, a frequency of the frame sync signal which is demodulated from the CD is set to 7.35 kHz. The spindle control circuit 224 for CD variably controls the rotational speed of the spindle motor 40 so as to keep the constant linear velocity in accordance with the track position in the radial direction of the CD. As for the rotational speed of the spindle motor 40 for the track position in the CLV control, in order to make the linear velocity on the medium constant irrespective of the track position, linear characteristics such that it is equal to a highest speed $V_H$ on the inner side and is equal to a lowest speed $V_L$ on the outer side are set. The spindle motor is controlled so as to obtain the rotational speed corresponding to the linear characteristics in accordance with the track position. For example, in case of the standard speed designation, the rotational speed is linearly changed so as to be equal to 500 rpm on the innermost track and to 200 rpm on the outermost track. Therefore, in case of the double speed designation by the register 226, the rotational speed is equal to 1000 rpm on the innermost track and is equal to 400 rpm in the outermost track. In case of the 4-times speed designation, the rotational speed is equal to 2000 rpm on the innermost track and to 800 rpm on the outermost track. Further, in case of the 6-times speed designation, the rotational speed is equal to 3000 rpm on the innermost track and to 1200 rpm on the outermost track. Switching information indicative of either the CAV control or the CLV control corresponding to the medium loaded at that time has been set into a register 246. Therefore, the multiplexer 228 selects either one of the CAV error detecting circuit 244 and the spindle control circuit 224 for CD in accordance with the selection information of CAV or CLV in the register 246, thereby establishing a control loop of the selected speed control system. Further, filter constants and gains can be set from the outside into the filter circuit 230 and gain control circuit 232. Similarly, an optimum filter constant and an optimum gain of the MPU for the register 246 are also set into those circuits and they are controlled.

Eccentricity Measurement

Figure 9:
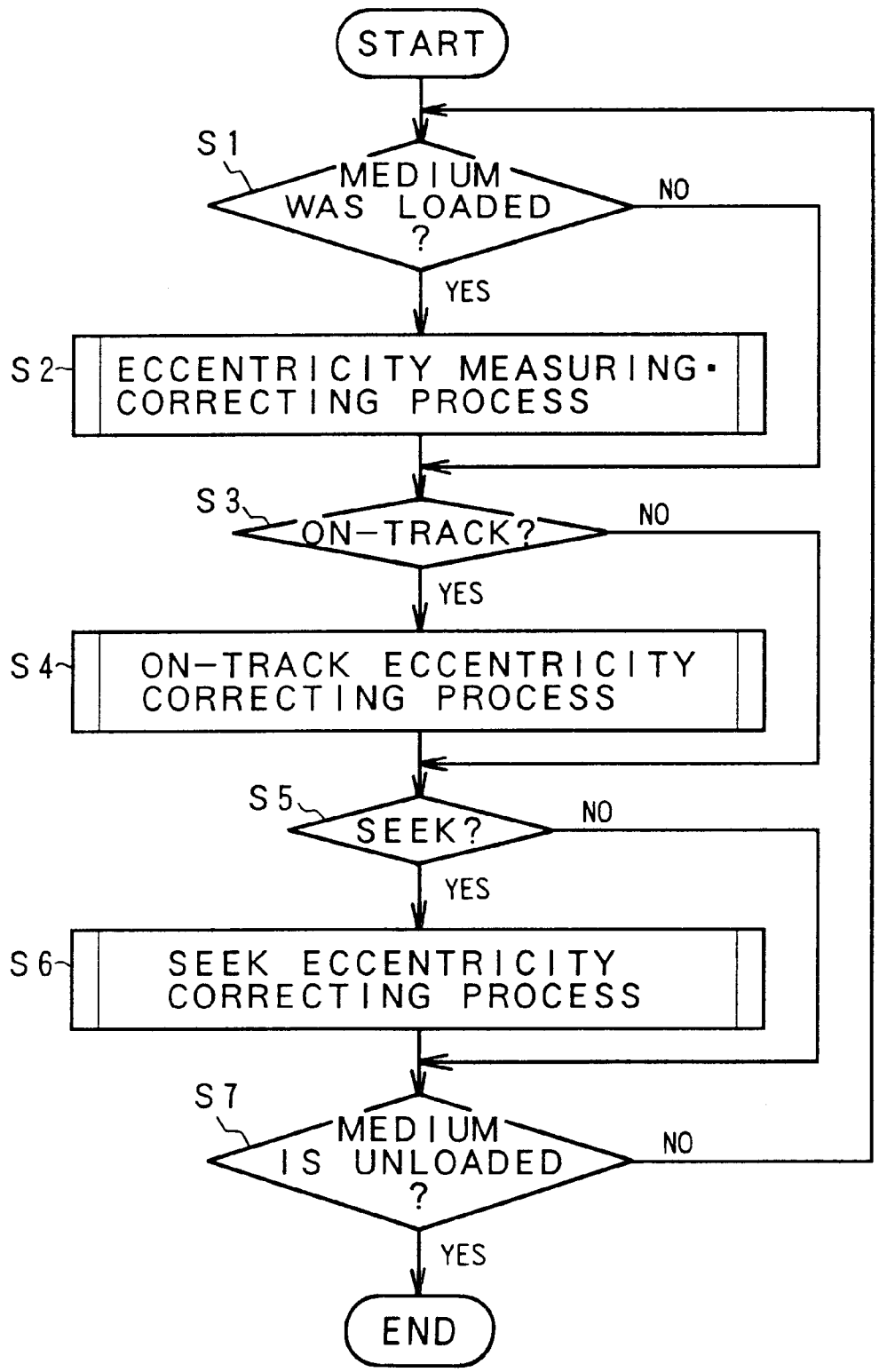
FIG. 9 is a schematic flowchart for an eccentricity measurement correcting process in FIG. 5.

FIG. 9 is a schematic flowchart for the eccentricity measurement correcting process in FIG. 7. When it is recognized in step S1 that the medium was loaded, step S2 follows. The eccentricity measuring process and the eccentricity correcting process are executed before a ready signal is issued to the upper apparatus. The eccentricity measuring process and the eccentricity correcting process for the medium loading are executed even for an MO cartridge and a CD except for a different point that the spindle control of the MO cartridge is based on the CAV and the spindle control of the CD is based on the CLV. When the on-track state is discriminated in step S3, an on-track eccentricity correcting process in step S4 is executed. In this case, the eccentricity measuring process at the time of the medium loading is not performed. The eccentricity correction using the measurement result in step S2 is executed. During the on-track operation, the spiral tracks of the CD and MO cartridge are continuously traced from the inner side to the outer side. In this case, with respect to the CD in which the medium rotational speed is changed for a track change, one rotational period (rotational speed) is actually measured for the first one track. However, in the second and subsequent tracks, the first actual measurement value is proportionally changed and the actual measurement is made unnecessary, thereby reducing a processing time. Further, when a seek to jump the light beam to an arbitrary track is discriminated in step S5, a seek eccentricity correcting process is executed in step S6. As a method of the seek eccentricity correcting process, there are two methods of a method of seeking after the rotational speed was changed to the rotational speed of the target track prior to seeking and a method of controlling to the rotational speed of the target track after the light beam was sought to the target track. Such an eccentricity correcting process is executed until the medium is unloaded in step S7.

Figure 10:
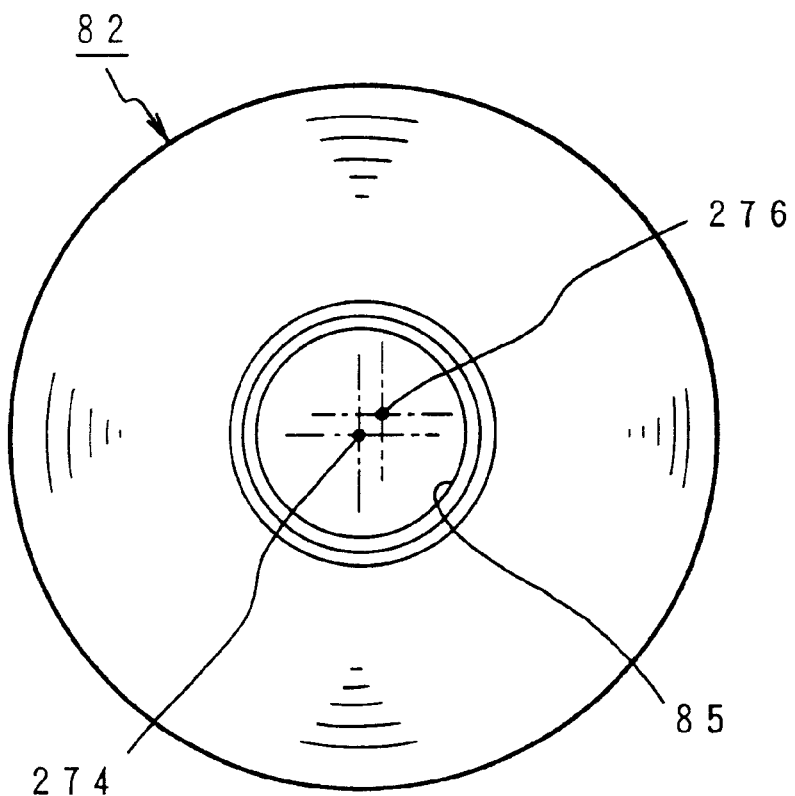
FIG. 10 is an eccentricity explanatory diagram of a CD medium.

The eccentricity measuring process of the eccentricity measuring unit 214 provided for the MPU 14 in FIG. 7 will now be described. FIG. 10 shows the CD medium 82 which is loaded to the optical disk drive of the invention. The CD medium 82 has an attaching hole 85 to be attached to the rotary shaft of the spindle motor at the medium center. A track center 276 formed on the medium surface ordinarily has an eccentricity of about tens of micrometers for a rotational center 274 of the attaching hole 85. Therefore, when the CD medium 82 is loaded and attached to the rotational center 274 of the spindle motor, an eccentricity of one cycle per rotation according to the eccentricity amount between the rotational center 274 and the track center 276 occurs on the track.

Figure 11:
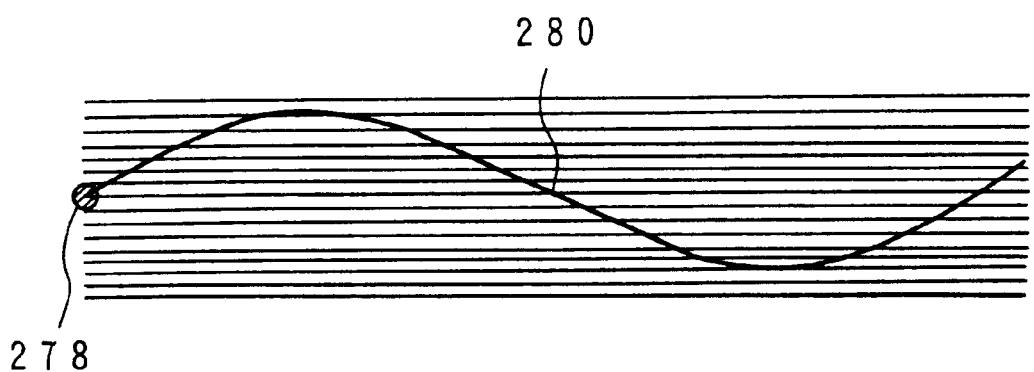
FIG. 11 is an explanatory diagram of a beam locus crossing a track in accordance with a medium eccentricity.

FIG. 11 shows a beam locus 280 for one rotation of the CD medium when a beam spot 278 is fixed at an arbitrary track position in a state where the carriage and the lens actuator are stopped. For simplicity of explanation, actually, the CD medium surface side where an eccentricity occurs is fixed and the motion of the beam spot 278 is relatively shown as a beam locus 280. Since the CD medium 82 has an eccentricity near tens of micrometers between the mechanical rotational center 274 and the track center 276, the beam locus 280 when the beam spot 278 is fixed and the medium is rotated causes a position change of one cycle per rotation due to an amplitude that is two times as large as the offset.

To measure the eccentricity amount in the optical disk medium as mentioned above, in the eccentricity measuring unit 214 in FIG. 7, only the focusing servo is turned on in a state where the VCM 64 and lens actuator 60 are stopped. As shown in FIG. 12A, the number (N) of zero-cross points of the tracking error signal E2 is counted with respect to one rotation. In this instance, as shown in FIG. 12B, the index signal (rotation detection signal) E4 which changes by using the index on the CD medium as a reference position, namely, a start position 290 of one rotation. That is, the number (N) of zero-cross points of the tracking error signal E2 is counted from a state where the index signal E4 rises at time t1 and the start position of one rotation is recognized. The number (N) of zero-cross points of the tracking error signal E2 until the index signal E4 again rises at time t6 is obtained. If the number (N) of zero-cross points for one rotational period (T) can be counted as mentioned above, now assuming that a track pitch is labeled as TP, the eccentricity amplitude (A) can be calculated by $$A=(N/2)TP$$

As shown in FIG. 11, as a phase $\phi$ for the 1-rotation start position 290 of the eccentricity amount having a profile as a sine wave of one cycle per rotation, a maximum time Tmax of the zero-cross interval of the tracking error signal E2 is obtained by using the 1-rotation start position 290 of the index signal E4 as a reference. A time T$\phi$ until a middle point of Tmax is labeled as an eccentricity phase $\phi$. That is, in FIG. 12A, since the zero-cross time interval from time t3 to t5 becomes the maximum time Tmax, the time interval until intermediate time t4 is determined to be the eccentricity phase $\phi$. As shown in FIG. 12A, if the eccentricity amplitude (A) and phase $\phi$ can be measured on the basis of the zero-cross point of the tracking error signal E2, the measurement results are set into the read control unit 220 of the DSP 15 in FIG. 7. The sine value corresponding to each rotating position is read out from the eccentricity memory 200 synchronously with the rotation of the CD medium. The eccentricity amount (L) is obtained by multiplying the sine value by the eccentricity amplitude (A) in the eccentricity amount correcting unit 222. The number (N) of zero-cross points per rotation of the tracking error signal E2 is again measured while performing the offset correction by the eccentricity amount (L) in the servo unit 216.

FIGS. 13A to 13C show the tracking error signal E2 at the time of the eccentricity correction when the eccentricity phase $\phi$ derived by the measurement in FIG. 12 coincides with the actual eccentricity phase together with the rotation detection signal E4 and an offset current Iv for eccentricity correction which is supplied to the VCM 64. When the measured eccentricity phase $\phi$ is correct as mentioned above, the eccentricity of the beam for the track is corrected by supplying the eccentricity correcting current Iv to the VCM 64. At this time, the number (N) of zero-cross points of the tracking error signal E2 which is obtained at one rotational period (T) is remarkably reduced to, for instance, six times. Since the number (N) of zero-cross points corresponds to the eccentricity amplitude remaining after completion of the eccentricity correction, it is possible to confirm that the correction based on the proper eccentricity measurement result is performed.

On the other hand, when the eccentricity phase $\phi$ measured in FIGS. 12A to 12C is deviated from the actual eccentricity phase by 180°, even if the eccentricity correction based on the measurement result is performed, the eccentricity amount is eventually contrarily increased. In such a case, as shown in FIGS. 14A to 14C, the number (N) of zero-cross points of the tracking error signal E2 which is obtained by one rotational period (T) of the rotation detection signal E4 extremely increases. When the number of zero-cross points increases for the measurement value as mentioned above, since the measured eccentricity phase $\phi$ is deviated by 180°, it is corrected to a phase ($\phi$+T/2) in which (T/2) corresponding to the half of the rotational period (T) is added to the measured eccentricity phase $\phi$. If the eccentricity phase can be corrected to the correct phase as mentioned above, by the eccentricity correction based on the corrected phase, as shown in FIG. 13A, it is possible to set to the optimum eccentricity correcting state in which the number of zero-cross points of the rotational period (T) is remarkably reduced as compared with that at the time of the first measurement.

FIG. 15 is a schematic flowchart for the eccentricity measuring process by the eccentricity measuring unit 214 provided for the MPU 14 in FIG. 7. In the optical disk apparatus of the invention, at the time of an initializing process in which an MO cartridge or a CD was loaded, subsequent to the first measuring process shown in step S1, the second measuring process is executed in step S2. The contents of the measuring process in each of steps S1 and S2 relate to processes for measuring the eccentricity amplitude (A) and eccentricity phase φ from the zero-cross point of the tracking error signal, subsequently performing the eccentricity correction by using the measurement results, and correcting the phase to an opposite phase if the number (N) of zero-cross points increases as shown in FIG. 12A. Further, the number (N) of zero-cross points per rotation when the eccentricity correction is executed is held every measuring process. When the second measuring process is finished in step S2, step S3 follows. The absolute value of a difference between the numbers of zero-cross points per rotation of the eccentricity correction based on the measurement results in the measuring processes at the first and second times, namely, in the previous and present measuring processes is obtained. When the absolute value of the difference lies within a predetermined threshold value TH, for example, in a range of a permitted eccentricity correction amount, specifically speaking, when it is equal to or less than (TH=10), the measurement result is determined to be correct. For instance, the measurement result in which the number of zero-cross points after the correction is smaller in the measurement results at the first and second times is used for the eccentricity correction. On the contrary, when the absolute value of the difference between the measurement results of the previous and present times exceeds the predetermined threshold value TH, the processing routine is again returned to step S2 and the measuring process is again performed. In this case, the third measuring process is executed. In step S3, a check is made to see whether the absolute value of a difference between the measurement results of the previous and present times, namely, at the second and third times is equal to or less than the threshold value TH or not. In this case, if an abnormal eccentricity measurement was performed in the first measuring process due to a vibration or the like, it lies within a range of the threshold value TH by the comparison of the absolute value of the difference between the measurement results of the previous and present times at the time of the third measurement and the correct measurement results can be used for the eccentricity correction. Therefore, even if a vibration, noises, or the like is applied at the stage of the eccentricity measurement in the initializing process after the optical disk medium was loaded and the erroneous measuring process is executed, by repeating the measuring process until the absolute value of the difference between the previous and present times lies within the predetermined threshold value, the use of the erroneous measurement result of the eccentricity amount can be automatically eliminated.

FIG. 16 is a flowchart for the eccentricity measuring process which is executed in each of steps S1 and S2 in FIG. 15. First in step S1, one rotation in which an index signal rises, namely, the presence or absence of the rotation start position is detected. When one rotation is detected, step S2 follows and the zero-cross point of the tracking error signal is discriminated. If the zero-cross point is obtained, the count value (N) of the counter is counted up by "1" in step S3.

In step S4, a check is made to see if the zero-cross time interval is larger than a maximum value MAX so far. If YES, the TZC time interval obtained newly is set to the maximum value MAX in step S5. With respect to the TZC time interval set to the maximum value MAX, an elapsed time from the detection of one rotation is inserted into the phase Tφ in step S6. The above processes are repeated until the next one rotation is detected in step S7. If the phase Tφ is derived from the count value (N) of the counter corresponding to one rotation and the maximum value of the TZC time interval therein by the detection of one rotation in step S7, the eccentricity amplitude (A) is calculated in step S8. The eccentricity phase φ is obtained in step S9. In step S10, the eccentricity correcting operation is performed on the basis of the measured amplitude (A) and eccentricity phase φ. In step S11, the number of zero-cross points due to the eccentricity amount of one rotation is measured by the counter (N) while performing the eccentricity correcting operation. In step S12, the values of the counter (N) before and after the measurement, namely, the count values of the zero-cross points are compared. If the value after the correction is reduced than that before the correction, the measurement results are decided to be correct and the processing routine is finished. If the value after the correction is increased, the eccentricity phase φ is corrected to *φ in which it is deviated by 180° and the eccentricity correcting operation is performed in step S13.

Eccentricity Correction

Figure 17A:
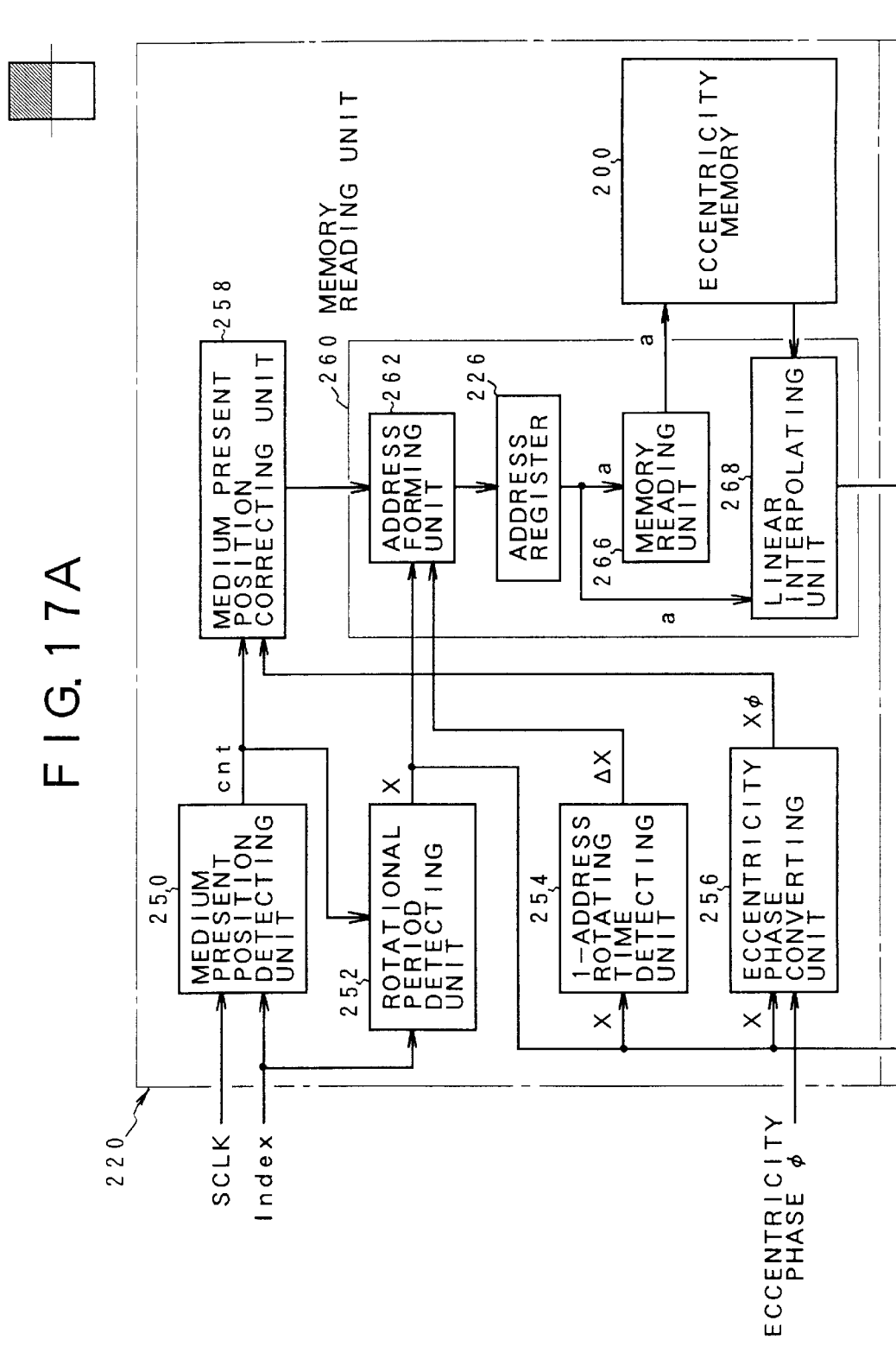

FIG. 17 is a functional block diagram of the read control unit 220 and eccentricity amount correcting unit 222 provided on the DSP 15 side in FIG. 7 and shows them together with the eccentricity memory 200 and servo unit 216. A medium present position detecting unit 250, a rotational period detecting unit 252, a 1-address rotating time detecting unit 254, an eccentricity phase converting unit 256, a medium present position correcting unit 258, a memory reading unit 260, and an eccentricity memory 200 are provided for the read control unit 220. The memory reading unit 260 has an address forming unit 262, an address register 264, a memory reading unit 266, and a linear interpolating unit 268. The eccentricity correcting unit 222 is constructed by an eccentricity correction amount operating unit 270 and an amplitude gain correcting unit 272. Further, in the servo unit 216, the adder 198 for adding the eccentricity correction amount, as an offset, obtained from the eccentricity memory 200 in the servo loop for the VCM 64 in FIGS. 4A and 4B is shown together with the limiter 196 and absolute value forming unit 204 arranged before and after the adder 198. The eccentricity memory 200 provided for the read control unit 220 has storage contents in FIGS. 18A to 18C.

FIG. 18A shows the sine value sinθa corresponding to one rotation of the medium which is stored in the eccentricity memory 200. A discrete sine value is stored every predetermined rotational angle Δθ. FIG. 18B shows the contents in the eccentricity memory 200. In the embodiment, one rotation of the medium is divided into 16 addresses in accordance with the number of addresses (C=16). Sixteen addresses of (a=00~15) are allocated as addresses (a) as shown in FIG. 18C. It will be obviously understood that the addresses (a) are not limited to the absolute addresses of (a=00~15) shown in the diagram but actually become relative addresses to which an offset of an arbitrary memory is added. In case of dividing the eccentricity memory 200 into 16 addresses as mentioned above, the rotational angle Δθ per address is $$\Delta\theta = 360°/C = 360°/16 = 22.5°$$

Therefore, sine values sin0°, sin22.5°, ..., sin359.5° of the rotational angles 0°, 22.5°, 45°, ..., 359.5° in which the rotational angles 0° to 360° are increased by every 1-address rotational angle Δθ=22.5° have been stored as binary data in the addresses a=00~15 in the eccentricity memory 200, respectively. The rotational angle 360° is the same as the rotational angle 0° in the address 00. Therefore, in the read access of the eccentricity memory 200, a rotational angle θa at the present time point is obtained by using the start position of one rotation of the rotational angle 0° in FIG. 18A as a reference. The address (a) in FIG. 18C is obtained by adding "1" to the quotient obtained by dividing the rotational angle θa at the present time point by the unit rotational angle Δθ per address. The corresponding sine value sinθa can be read out by reading out the eccentricity memory 200 by the address (a).

In the embodiment of FIG. 17, the number of pulses obtained by counting the sampling clocks which decide the operating cycles of the MPU 14 and DSP 15 in FIGS. 1A and 1B is used for detection of the present rotational angle in which the rotation start position of the rotational angle θ=0° is used as a reference. The number cnt of sampling pulses of the sampling clocks serving as a reference is shown in FIG. 18C with respect to one rotation of the medium. The counting operation of the number cnt of sampling pulses is started at the rotational angle 0°. The number of samples of one rotation at the rotational angle 360°, namely, when the rotation reaches one rotation is labeled as (X). For example, now assuming that the rotational speed of the medium is equal to 3600 rpm, one rotational period is equal to 16 msec. When it is assumed that 17 MHz is used as a frequency of the sampling clock, the number (X) of sampling pulses of one rotation is equal to 272000 pulses. For the number (X) of sampling pulses of one rotation, the number ΔX of sampling pulses of one address in the eccentricity memory 200 having 16 addresses (a=00 to 15) is $$\Delta X = X/C \tag{6}$$

For example, when X=272000 pulses, ΔX=17000 pulses. The number of addresses in the eccentricity memory 200 can be also further increased in order to raise a resolution. For instance, when setting C=32 addresses, the number ΔC of sampling pulses of one address is equal to ΔC=8500 pulses. If the number of addresses in the eccentricity memory 200 is too large, the memory capacity increases. Therefore, it is necessary to suppress to up to, for example, about 64 addresses. In the following explanation, C=16 addresses is used as an example for simplicity of explanation. When one rotation of the medium is detected as the number (x) of sampling pulses by the counting of the sampling clocks, the counter to count the number of sampling pulses is reset and started at the rotational angle 0°. The counting operation of the number cnt of sampling pulses is started. The number cnt of sampling pulses at the present time point is divided by the number ΔX of sampling pulses of one address. By adding "1" to the quotient, the address (a) is obtained. The eccentricity memory 200 can be read by the address (a). However, in case of reading the sine values in which the eccentricity memory 200 is set to 16 addresses per rotation, the resolution of the sine values is extremely low. In the embodiment of FIG. 17, therefore, when the number cnt of sampling pulses indicative of the present rotating position lies within the rotational angle which gives 16 addresses in the eccentricity memory 200, the sine value corresponding to the number cnt of sampling pulses at the present time point among the sine values stored in the eccentricity memory 200 is obtained by the linear interpolation using the sine value sinθa in the eccentricity memory 200 read out by the address (a) at this time and the sine value change amount sinΔθ per address.

The function of the read control unit 220 in FIG. 17 using the eccentricity memory 200 having the construction shown in FIGS. 18A to 18C will now be described in detail. First, the medium present position detecting unit 250 inputs a sampling clock SCLK of, for example, 17 MHz and the index signal which is derived every rotation of the medium. When the index signal is obtained, a counter built in the detecting unit 250 is reset and started and the counting operation of the sampling clock is performed. A counting result is outputted as the number cnt of medium present position pulses in which the rotation start position where the light beam is at present irradiated and the index is obtained is used as a reference. Therefore, by checking the number cnt of sampling pulses from the medium present position detecting unit 250, the medium rotating position where the light beam is at present irradiated can be recognized for the start position of one rotation in which the index is used as a reference. The rotational period detecting unit 252 latches the medium present position pulse number cnt at a timing when the index signal is obtained, thereby detecting the rotational period pulse number (X) showing the rotational period of one rotation of the medium. In the detection of the rotational period pulse number (X) by the rotational period detecting unit 252, now assuming that the read control unit 220 is activated at an arbitrary timing, it is necessary to wait for the rotation of at most one rotation of the medium. When the rotational period pulse number (X) is detected by the rotational period detecting unit 252, the 1-address rotating time detecting unit 254 divides the rotational period pulse number (X) by the preset number (C) of addresses in the eccentricity memory 200 shown in FIGS. 18A to 18C, namely, the number ΔX of rotating pulses of one address is detected by $$\Delta X = X/C \tag{6}$$

The eccentricity phase converting unit 256 inputs the eccentricity phase φ obtained by the measuring process by the eccentricity measuring unit 214 provided on the MPU 14 side in FIG. 7 and converts it to an eccentricity phase pulse number Xφ which is expressed by the number of pulses by the counting of the number of sampling clocks. That is, the eccentricity phase is converted to the eccentricity phase Xφ expressed by the number of pulses of the sampling clocks as $$X\phi = X(\phi/360°)$$

In the measurement of the eccentricity phase in FIGS. 12A to 12C, 13A to 13C, and 14A to 14C, in case of expressing it by using the eccentricity phase Xφ shown by the number of pulses of the sampling clocks, the eccentricity phase converting unit 256 is unnecessary. The eccentricity phase Xφ converted to the pulse number of the sampling clocks by the eccentricity phase converting unit 256 is supplied to the medium present position correcting unit 258, thereby correcting the deviation due to the eccentricity phase of the medium present position pulse number cnt derived from the medium present position detecting unit 250.

FIGS. 19A to 19C show a correcting process of the medium present position pulse number cnt using the eccentricity phase Xφ in the medium present position correcting unit 258 in FIG. 17. FIG. 19A shows the index signal showing one rotation of the medium. FIG. 19B shows the eccentricity of one rotation of the medium. FIG. 19C shows the contents of the correction of the medium present position count number cnt. First, it is now assumed that an eccentricity start point 265 at which the eccentricity amount is equal to 0 in FIG. 19B is deviated by the phase φ from the start position of one rotation of the medium where the index signal rises in FIG. 19A. When there is the deviation of the phase φ in an eccentricity locus of the medium as mentioned above, even if the medium present position pulse number cnt by the counting of the sampling clocks is obtained by the medium present position detecting unit 250 in FIG. 17 from the start position of one rotation where the index signal rises to the H level and is address converted, the sine value of the eccentricity memory 200 in FIGS. 19A to 19C corresponding to the actual eccentricity amount cannot be read out. Therefore, after the present position pulse number cnt of the medium was corrected to a state without the eccentricity phase φ, namely, so as to obtain φ=0, the address (a) is obtained, thereby enabling the eccentricity memory 200 having the contents in FIGS. 18A to 18C to be accurately read out in correspondence to the actual eccentricity. In this correction, the present position pulse number cnt of the medium and the eccentricity phase Xφ are compared and the address is separately obtained with respect to the case where the present position pulse number cnt lies within a range of 0~Xφ and the case where it lies within a range of Xφ~X. First, now assuming that the case where the present position pulse number cnt lies within a range of $$0 \leq cnt < X\phi$$

as shown in FIG. 19C is called a cnt(1), the present position pulse number cnt is corrected by the following equation in this case.

$$cnt = (X - X\phi) + cnt \quad (7)$$

On the other hand, in the case where the present position pulse number cnt lies within a range of $$X\phi \leq cnt < X,$$

the present position pulse number cnt is corrected as shown by cnt(2) in FIG. 19C by the following equation.

$$cnt = cnt - X\phi \quad (8)$$

By such corrections of the equations (7) and (8), even in the case where there is the eccentricity phase φ as shown in FIGS. 19A to 19C, the present position pulse number cnt is corrected to a value of the eccentricity phase φ=0 in which cnt=0 at the rotation start position of one medium rotation which is detected by the index signal as shown in FIGS. 18A to 18C.

Referring again to FIG. 17, in the memory reading unit 260, the address (a) to read out the eccentricity memory 200 shown in FIGS. 18A to 18C is formed by the address forming unit 262. For example, the address forming unit 262 forms the address from the medium present position pulse number cnt corresponding to the eccentricity phase φ=0 corrected by the medium present position correcting unit 258, the rotational period pulse number (X) corresponding to the present medium rotational speed detected by the rotational period detecting unit 252, and the 1-address rotating pulse number ΔX detected by the 1-address rotating time detecting unit 254. Specifically speaking, in order to form the address in the eccentricity memory 200 from the start position of one rotation of the medium by the index signal, the address (a) is set to a=00 at the timing when the index signal is obtained. In this initial state of the address a=00, the address forming unit 262 obtains the address upper limit value of the present address a=00 and compares it with the present position pulse number cnt. The address upper limit value by the count expression of the number of sampling pulses in the present address (a) is $$\text{address upper limit value} = \Delta X(a+1) \quad (9)$$

In the address forming unit 262, the address upper limit value is compared with the present position pulse number cnt. For a period of time during which $$cnt < \Delta X(a+1),$$

namely, when the present position pulse number cnt doesn't reach the address upper limit value, the present address (a) is maintained. On the other hand, when $$cnt \geq \Delta X(a+1),$$

namely, when the present position pulse number cnt reaches the address upper limit value, the address (a) is updated by "1", thereby setting a=a+1. The address (a) formed by the address forming unit 262 in this manner is held in the address register 264. The sine value sinθa corresponding to the address (a) is read out by reading the eccentricity memory 200 by the memory reading unit 266 and is outputted to the linear interpolating unit 268. The linear interpolating unit 268 discriminates whether the present position pulse number cnt by the address (a) in the address register 264 formed by the address forming unit 262 has reached the address upper limit value given by the equation (9) or not. When it does not reach the address upper limit value, a sine value sinθa corresponding to the present position pulse number cnt is calculated by a linear interpolation based on the sine value sinθa of the address (a) obtained from the eccentricity memory 200 at that time, the number (b) of pulses in 1-address range of the present address, and further, a sine value change amount sinΔθ of one address.

Figure 20:
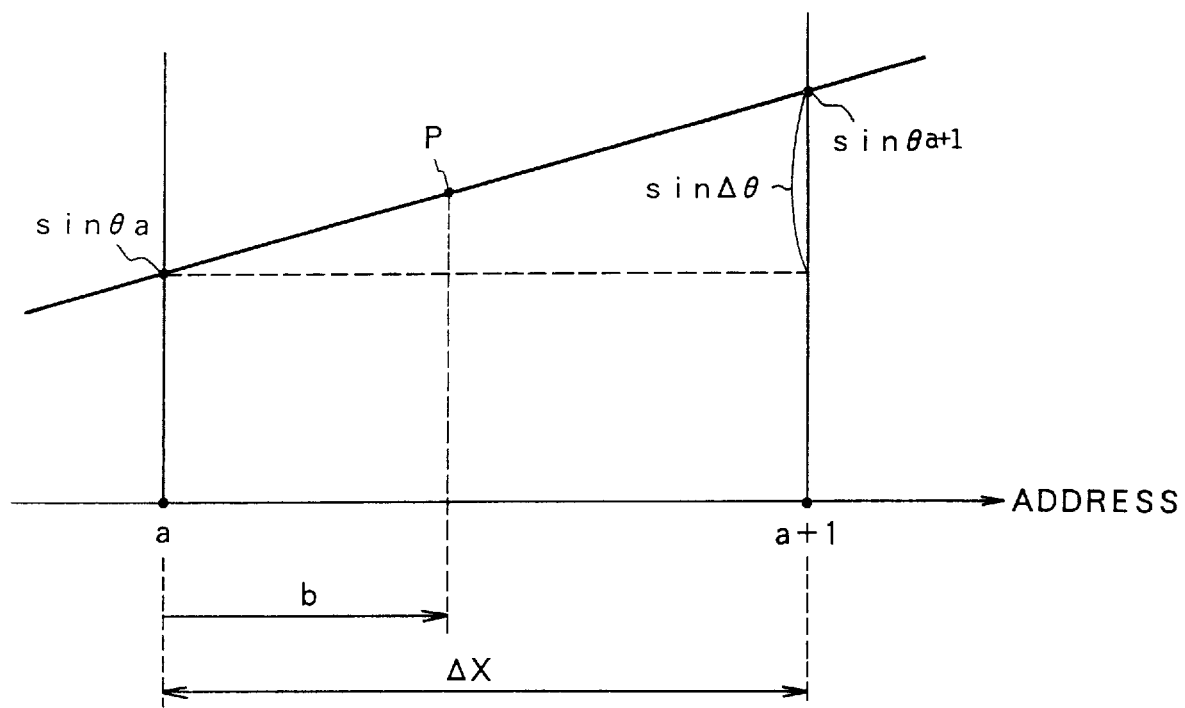
FIG. 20 is an explanatory diagram of a linear interpolating process.

FIG. 20 describes the arithmetic operating process of the linear interpolating unit 268 in FIG. 17. It is now assumed that the address formed in the eccentricity memory 200 is the address (a) and sinθa was read out. In this state, the number (b) of pulses in one address range is obtained from the address (a) as a start point. A sine value of the rotational angle at the present position (P) which is determined by the pulse number (b) is obtained by the linear interpolation. In this instance, the sine value of the address (a+1) which is one address subsequent to the address (a) is equal to (sinθa+1) which is increased by only a sine value sinθe of a rotational angle Δθ corresponding to one address. Therefore, if the sine value sinθa of the address (a), the number (b) of pulses in one address, and the change amount sinθe of the sine value corresponding to one address are obtained, the sine value sinθa at the present position (P) of the pulse number (b) can be calculated by the linear interpolation by the following equation.

$$\sin\theta a = \sin\theta a + \sin\Delta\theta \cdot (b/\Delta X) \quad (10)$$

Referring again to FIG. 17, the sine value sinθa corresponding to the present position pulse number cnt obtained by the interpolating process by the linear interpolating unit 268 is supplied to the eccentricity correction amount operating unit 270 provided for the eccentricity correcting unit 222. The eccentricity correction amount operating unit 270 calculates the eccentricity correction amount (L) by the following equation on the basis of the eccentricity amplitude (A) measured by the eccentricity measuring unit 214 provided on the MPU 14 side in FIG. 7 and the sine value sinθa obtained from the eccentricity memory 200 by the read control unit 220.

$$L = A \cdot \sin\theta a \quad (11)$$

Further, in the eccentricity correcting unit 222, a correction coefficient to correct a gain of the amplitude (A) in accordance with a change in medium rotational speed is calculated by an amplitude gain correcting unit 272 and is multiplied to the eccentricity correction amount (L) derived from the eccentricity correction amount operating unit 270.

The again correction of the amplitude (A) is as follows. In the embodiment, the eccentricity correction is executed by the servo loop of the VCM. An acceleration α of the VCM to trace the sine wave-shaped eccentricity is given by the following equation.

$$\alpha = G \cdot Ia \cdot \sin\omega t \tag{12}$$

where,

G: accelerating performance of the VCM [G/amperes]

Ia: amplitude of the acceleration current [amperes]

ω: angular frequency of the medium rotation [rad/sec]

For the acceleration α which traces the sine wave-shaped eccentricity of the VCM as mentioned above, the eccentricity amount (L) corresponds to the integration of two times of the acceleration α, it is given by the following equation.

$$L = \int\int \alpha = (G \cdot Ia/\omega^2)\sin\omega t \tag{13}$$

That is, it will be understood that the eccentricity amount (L) is inversely proportional to the square of the rotational speed of the medium. Therefore, even if the rotational speed of the medium changes, since the eccentricity amount (L) is constant, as for the light beam as well, it is now assumed that, for example, a state where the light beam is set to the position of the highest rotational speed on the innermost side is labeled as a reference rotational speed, namely, the reference number Xr of rotation period pulses and a gain at this time is equal to 1. It is also now assumed that a gain correction coefficient $$\{1/(X/Xr)^2\}$$

that is inversely proportional to the square of a change amount from the reference rotational speed, namely, of the value (X/Xr) obtained by dividing the rotational period (X) of the present rotational speed by the rotational period Xr of the reference rotational speed is multiplied to the right side of the equation (13), the tracking control for the eccentricity correction by the driving of the VCM can be performed for a change to an arbitrary rotational speed for the reference rotational speed. Thus, eccentricity correction amount operating unit 270 obtains the eccentricity amount (L) as $$L = A \cdot \{1/(X/Xr)^2\} \cdot \sin\theta a \tag{14}$$

The operating unit 270 inputs the eccentricity amount (L) as an offset to the adder 198 of the servo unit 216 and applies a motion opposite to the eccentricity of the medium to the VCM, thereby correcting the eccentricity. It is desirable to correct the gain of the amplitude (A) in the equation (14) when the change amount of the detection period (X) of the rotational speed at the present time point for the rotational period Xr of the reference rotational speed is equal to or larger than a predetermined threshold value.

Figure 21:
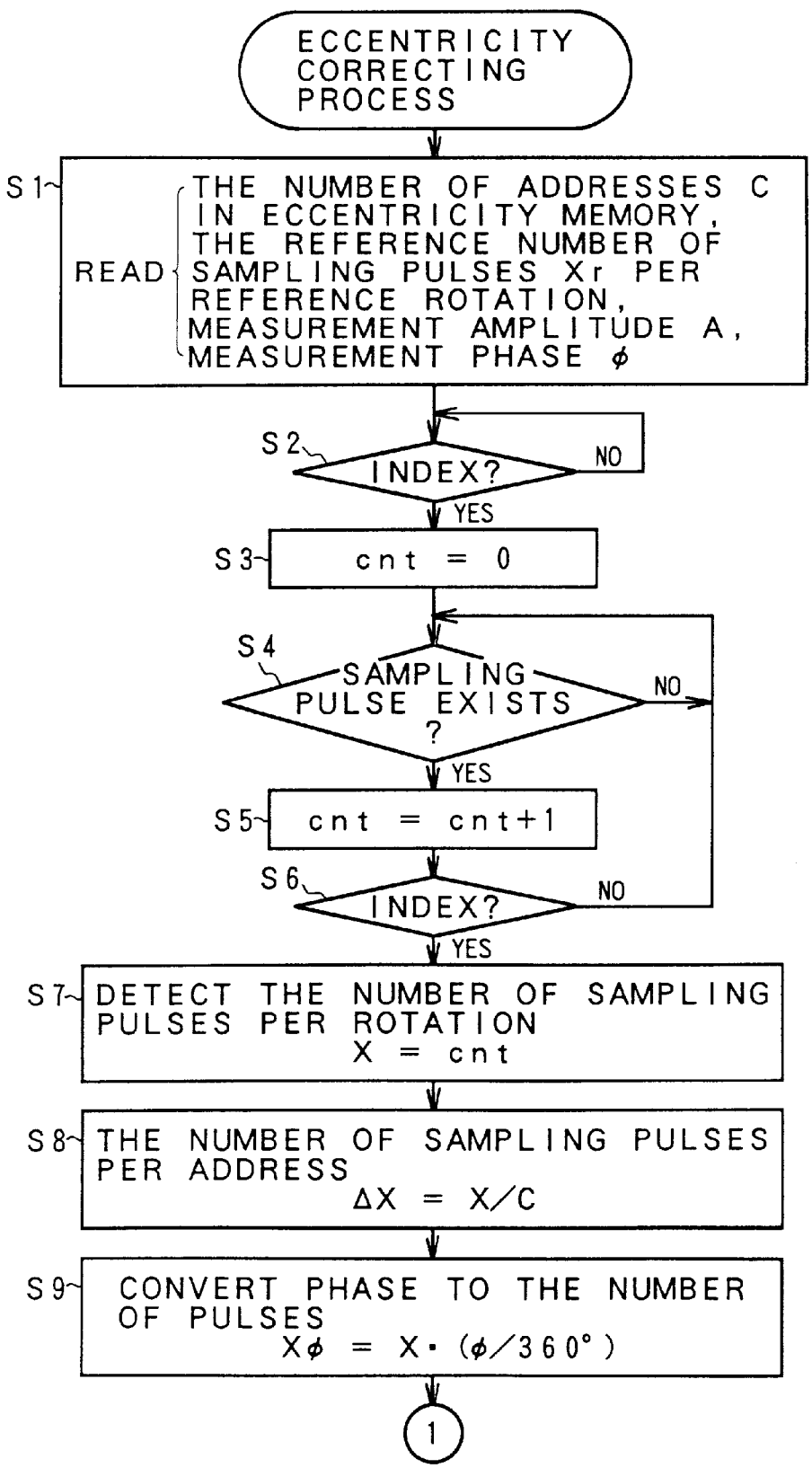
FIG. 21 is a flowchart for the eccentricity correcting process of the invention.
Figure 22:
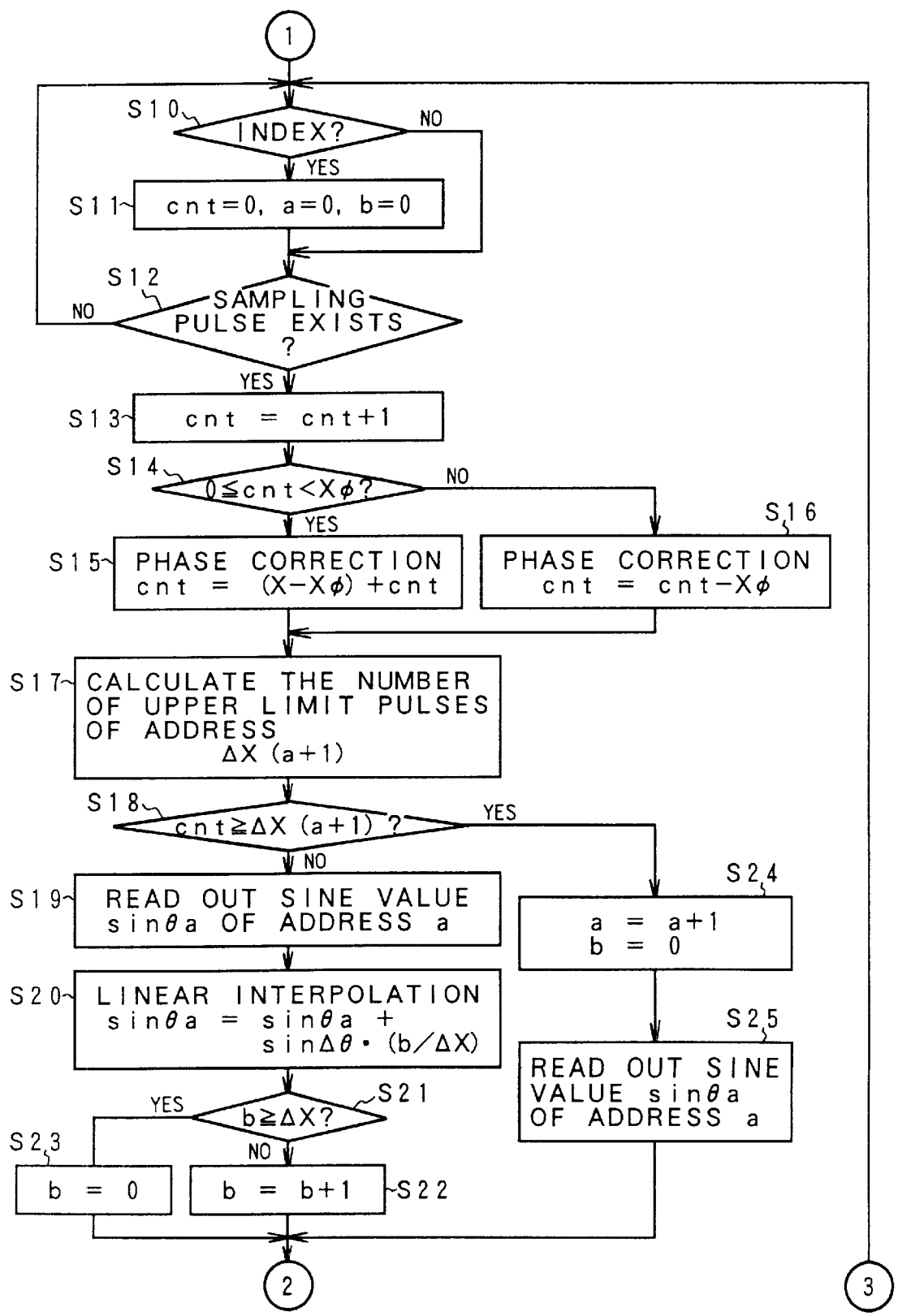
FIG. 22 is a flowchart for the eccentricity correcting process of the invention subsequent to FIG. 21.
Figure 23:
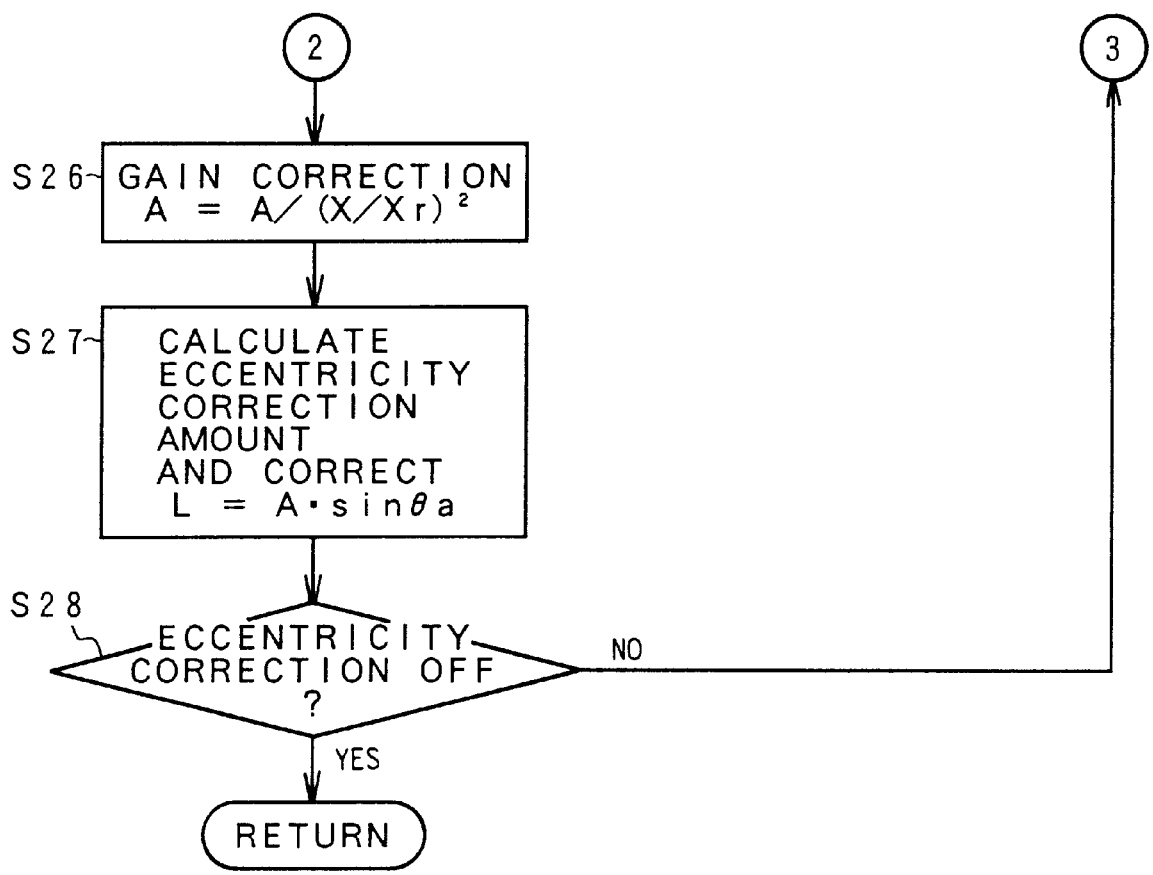
FIG. 23 is a flowchart for the eccentricity correcting process of the invention subsequent to FIG. 22.

FIGS. 21, 22, and 23 are flowcharts for the eccentricity correcting process by the read control unit 220 and eccentricity amount correcting unit 222 in FIG. 17. When the eccentricity correcting process is started, first in step S1, the number (C) of addresses in the eccentricity memory 200, the number Xr of sampling pulses of one rotation of the reference rotational speed, the amplitude (A) obtained by the eccentricity measurement, and the phase φ are read. In step S2, the index signal which is obtained every rotation of the medium is checked. When the index signal is obtained, step S3 follows and the present position pulse number cnt indicative of the present medium position is reset to 0. In step S4, the sampling clock pulse is checked. When there is the sampling clock pulse, the present position pulse number cnt is counted up by "1" in step S5. The counting-up operation of the present position pulse number cnt is continued until the index signal is again obtained in step S6. By latching the present position pulse number cnt when the index signal is obtained in step S6, the number (X) of sampling pulses of one rotation can be detected. When the 1-rotation sampling pulse number X can be detected, the number ΔX of samples per address is calculated in step S8. The measured phase φ is converted to the number Xφ of pulses in step S9. By the processes up to step S9, the calculation of the parameters to generate the address in the eccentricity memory 200 is completed.

The processing routine subsequently advances to step S10 in FIG. 22. Step S11 follows at a timing when the index signal is obtained. Each of the present position pulse number cnt, address (a), and the number (b) of pulses in the address is reset to 0. In step S12, the sampling clock pulse is detected. Each time the sampling clock pulse is obtained, step S13 follows and the present position pulse number cnt is counted up. In step S14, a check is made to see if the present position pulse number cnt lies within a range from 0 or more to a value less than the eccentricity phase Xφ. If YES, step S15 follows and the present position pulse number cnt is corrected by the equation (7), namely, in accordance with the condition of cnt(1) in FIG. 19C. In step S14, when the present position pulse number cnt is equal to or larger than the eccentricity phase Xφ and is less than the 1-rotation pulse number (X), step S16 follows. The correction of the present position pulse number cnt by the eccentricity phase is executed by the equation (8) according to the condition of cnt(2) in FIG. 19C. The upper limit address ΔX(a+1) of the present address (a) is calculated in step S17 and is compared with the present position pulse number cnt in step S18. When the present position pulse number doesn't reach the address upper limit value, step S19 follows. The sine value sinθa of the address (a) is read out from the eccentricity memory 200. In step S20, the sine value sinθa corresponding to the present position pulse number cnt is calculated by the linear interpolation according to the equation (10). In step S21, a check is made to see if the number (b) of pulses in one address has reached the number ΔX of pulses of one address. When it is less than ΔX, the pulse number (b) is counted up by "1" in step S22. When it reaches ΔX, the pulse number (b) is reset to 0 in step S23. When the present position pulse number cnt reaches the address upper limit value in step S18, step S24 follows, the address (a) is counted up and updated by "1" and the number (b) of pulses in the address is reset to b=0. In step S25, the sine value sinθa of the address (a) after completion of the updating is read out from the eccentricity memory 200 in step S25.

The processing routine subsequently advances to step S26 in FIG. 23. The amplitude (A) obtained by the eccentricity measurement is gain corrected by multiplying a coefficient that is inversely proportional to the square of a ratio between the reference rotational period Xr of the reference rotational speed and the rotational period (X) of the present medium rotational speed. In step S27, the eccentricity correction amount (L) is calculated by the amplitude (A) after completion of the gain correction and the sine value sinθa obtained from the eccentricity memory 200 and is inputted as an offset to the adder 198 of the servo unit 216. A motion opposite to the eccentricity amount is applied to the VCM, thereby correcting the medium eccentricity. The correcting processes from step S10 in FIG. 22 to step S27 in FIG. 23 as mentioned above are repetitively executed each time the sampling clock is obtained until the turn-off of the eccentricity correction is discriminated in step S29.

Figure 24:
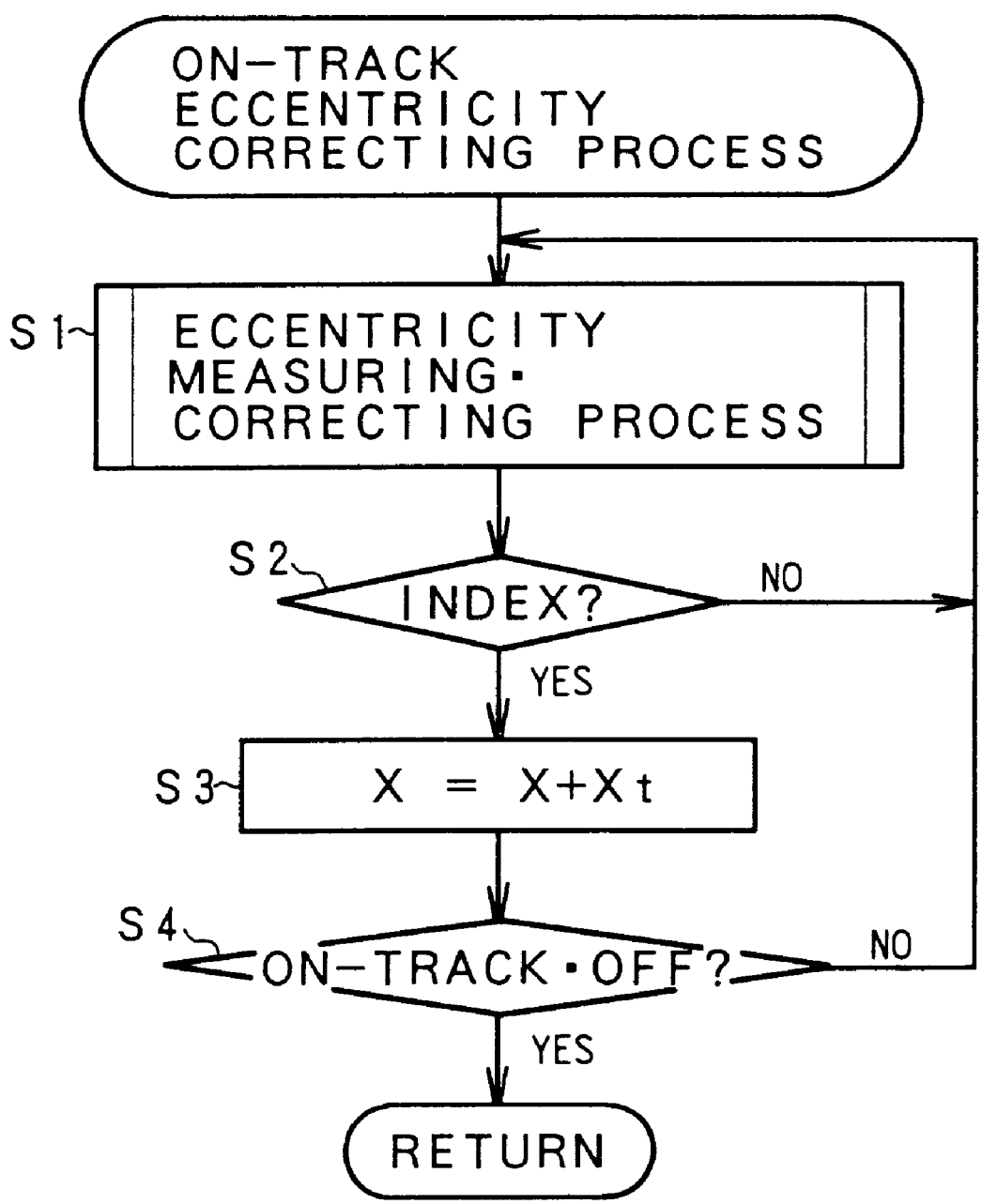
FIG. 24 is a flowchart for an on-track eccentricity correcting process in FIG. 9.

FIG. 24 is a specific flowchart for the on-track eccentricity correcting process in step S4 in FIG. 9. In the on-track state where the reproducing operation of the CD medium is performed, by allowing the light beam to trace the spiral track of the CD medium, the medium rotational speed continuously changes every rotation of the CD medium. That is, in the CD medium, the light beam is made trace the spiral track from the inner side to the outer side. Thus, in the first one rotation of the medium in the on-track state, as shown in the flowcharts of FIGS. 21 to 23, it is necessary to actually measure the rotational period pulse number (X) of one medium rotation and to perform the eccentricity correction at the medium rotational speed obtained in this instance. After the second and subsequent rotations, however, it has previously been known that the rotational period pulse number (X) indicative of the medium rotational speed which was actually measured by the first one rotation is increased by the number Xt of pulses as a fixedly determined speed change, namely, periodic change in the next track. In the on-track eccentricity correction, therefore, in step S1, the same processes as those shown in FIGS. 21 to 23 are executed with regard to the eccentricity correcting process of the first one rotation. However, when the index signal is detected in step S2 and the light beam is moved to the next track, in step S3, the change pulse number Xt corresponding to the speed change when the light beam is moved to the outer side by a distance of one track which has fixedly been determined is added to the rotational period pulse number (X) which was actually measured in step S1, thereby setting to the rotational detecting period (X) showing the medium rotational speed at the present time point. The processing routine is returned to step S1. The eccentricity correcting process shown in FIGS. 21 to 23 is executed. It will be obviously understood that if the on-track operation is turned off in step S4, a series of processes are finished and the processing routine is returned to the main routine. The number Xt of pulses which is used in step S3 and corresponds to the change in medium rotational speed when it is changed by an amount of one track is unconditionally obtained by the following equation.

$$Xt = (X\max - X\min)/TA \tag{15}$$

where,

Xmax: outermost rotational period (outermost lowest rotational speed)

Xmin: innermost rotational period (innermost highest rotational speed)

TA: the total number of medium tracks

In the on-track eccentricity correcting process as mentioned above, since the light beam is allowed to spirally trace the spiral track, it is necessary to actually measure the rotational period pulse number (X) corresponding to the medium rotational speed with respect to the first rotation. However, as for the second and subsequent rotations, by merely adding the fixed value Xt to the actual measurement value (X) at the time of the first rotation, the rotational period (X) corresponding to the present medium rotational speed is soon obtained. In case of actually measuring the rotational period (X), although a waiting time corresponding to up to one rotation is necessary, such a rotation waiting time is unnecessary and the time that is required for the eccentricity correction can be reduced in correspondence to such an unnecessary rotation waiting time.

Figure 25:
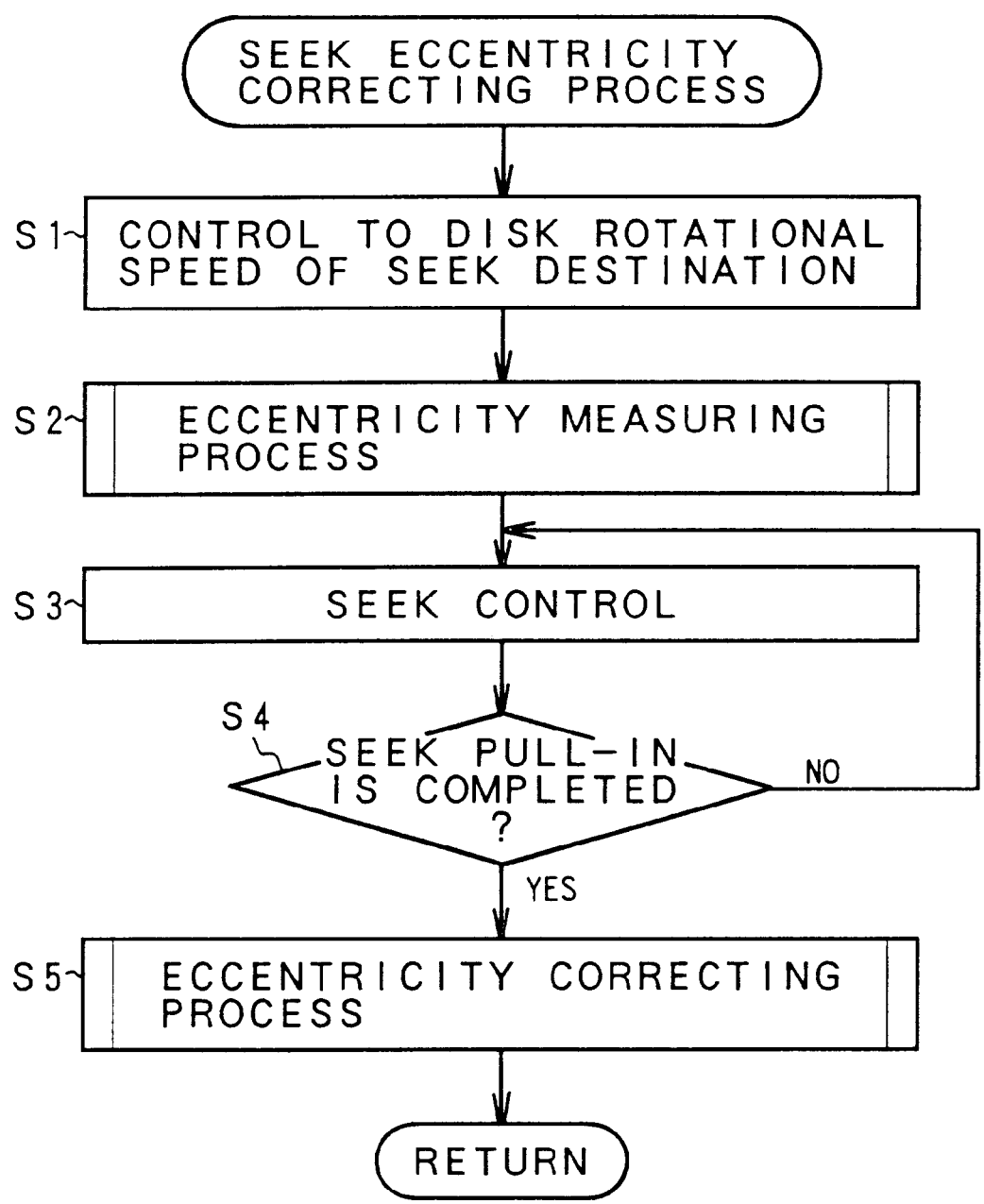
FIG. 25 is a flowchart for a seek eccentricity correcting process in FIG. 9.

FIG. 25 is a specific flowchart for the seek eccentricity correcting process in step S6 in FIG. 9. In the seek eccentricity correcting process, when a seek command is issued from the upper apparatus, the rotational speed is controlled to the disk rotational speed on the seek destination side and the eccentricity is measured prior to starting the seek control. After that, the seeking operation is performed and the eccentricity correction is executed after completion of the seek pull-in. That is, in step S1, when the seek control is performed, the rotational speed is controlled to the disk rotational speed which is sent from the upper apparatus and corresponds to the track number on the seek destination side. In this state, the eccentricity measuring process is executed in step S2. The eccentricity measuring process is the same as that in the flowcharts shown in FIGS. 15 and 16. When the eccentricity measuring process is finished, the seek control is started in step S3 and the light beam is jumped to the target track which has already been sought. When the completion of the seek pull-in is discriminated in step S4, the eccentricity correcting process is executed in step S5. The eccentricity correcting process is as shown in FIGS. 21 to 23.

Figure 26:
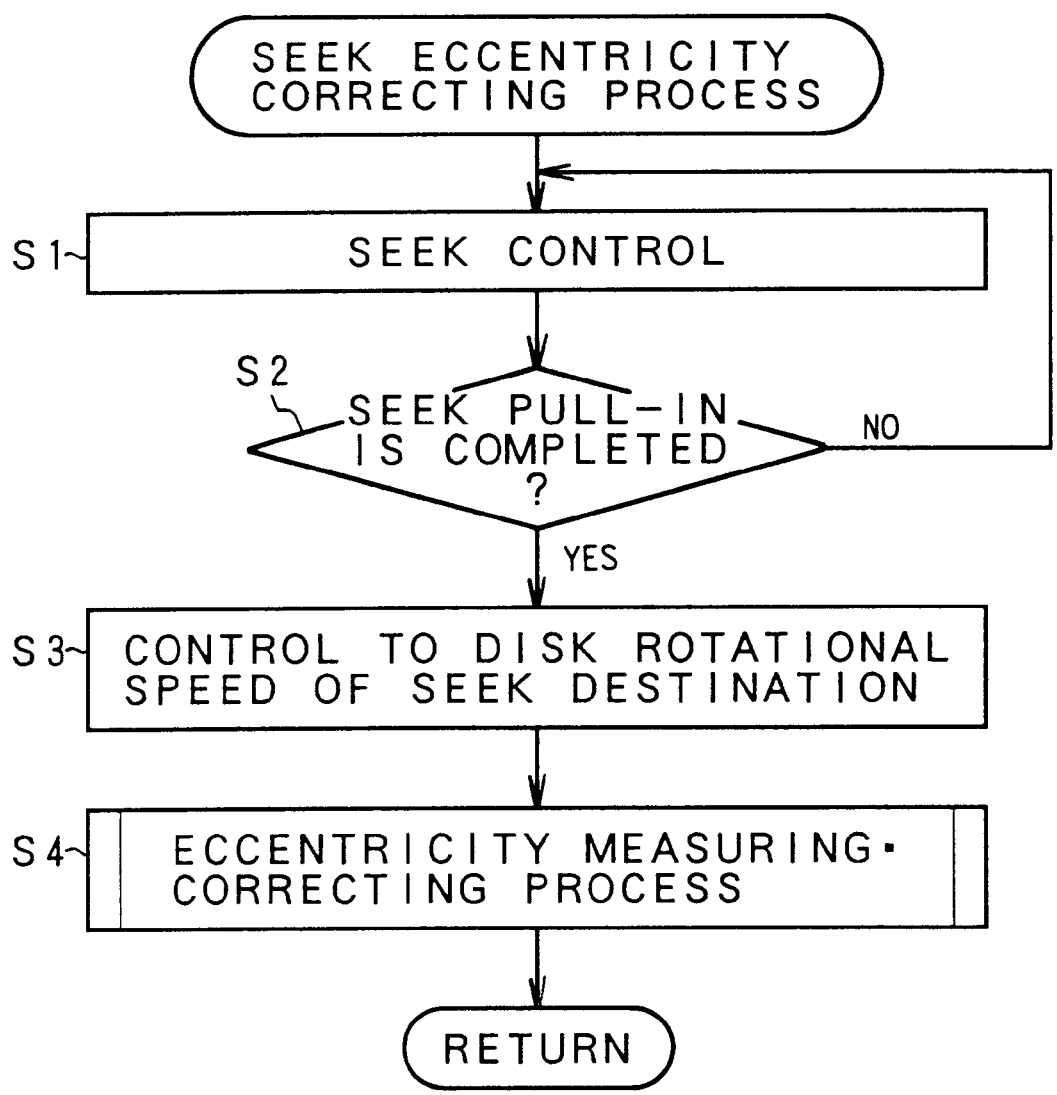
FIG. 26 is a flowchart for another embodiment for the seek eccentricity correcting process in FIG. 9.

FIG. 26 shows another embodiment of the seek eccentricity correcting process. In this embodiment, in case of the seek control, the light beam is jumped to the target track while the original medium rotational speed is kept. After completion of the seek pull-in, the disk rotational speed is changed to the rotational speed of the target track, thereby performing the eccentricity measurement and the correcting process. That is, in step S1, a seek control for jumping the light beam to the target track is executed on the basis of a seek command. In step S2, when the completion of the seek pull-in of the light beam to the target track is discriminated, the rotational speed is controlled to the disk rotational speed on the seek destination side in step S3. After that, the eccentricity measurement and the correcting process are executed in step S4.

According to the invention as mentioned above, even if the medium rotational speed differs depending on the position in the medium radial direction due to the constant linear velocity (CLV), by merely preparing one kind of eccentricity memory, the sine value for the eccentricity correction corresponding to the rotating position of the medium where the light beam is irradiated at present can be read out from the eccentricity memory. Thus, a number of kinds of eccentricity memories according to the change in medium rotational speed for the constant linear velocity control (CLV control) are made unnecessary. Thus, the memory capacity of the eccentricity memory can be remarkably reduced and the apparatus costs can be decreased.

When the medium is loaded to the apparatus, since the eccentricity amount is measured and the eccentricity correction is performed, even for a medium having a large eccentricity, a tracking ability and a performance at the time of the seek pull-in are improved and the accessing performance can be raised.

Although the foregoing embodiment has been explained with respect to the example of the eccentricity measurement and the eccentricity correction in association with the variable control of the medium rotational speed when the beam position changes in the radial direction in the CD medium having a constant linear velocity control (CLV control). However, in the MO cartridge medium based on the constant angular velocity control (CAV control), the eccentricity is once measured at the constant medium rotational speed which has fixedly been determined in the initial state until a high-level ready signal is set into the upper apparatus after the MO cartridge was loaded into the apparatus. The medium rotational speed is not changed after that. Therefore, it is sufficient to unconditionally perform the eccentricity correcting process based on the eccentricity information which was measured for the first time. With respect to the eccentricity correction of the MO cartridge medium, the eccentricity memory 200 which is used for the CD medium can be also commonly used. Or, an eccentricity memory having, for example, a larger number of addresses for eccentricity correction of the MO cartridge can be also separately used.

Although the above embodiments have been explained with respect to the optical disk drive, as an example, which can use both of the MO cartridge medium and the CD medium, the invention can be also applied as it is to a read only optical disk drive for the CD. The invention is not limited to the MO cartridge but the invention can be also applied as it is to an optical disk drive which can use both of the DVD medium and the CD medium. The invention is not limited by the numerical values shown in the embodiments. The present invention further incorporates proper embodiments modified within the scope of the invention without departing from the object thereof.

What is claimed is:

1. An optical storage apparatus comprising:
   a positioner for moving an objective lens to irradiate a light beam to a medium in a direction traversing tracks on the medium;
   an access control unit for moving the light beam from an optical unit to a target track so as to be ontracked by a driving control of said positioner;
   a linear velocity control unit for variably controlling a rotational speed of said medium in accordance with a radial position of the medium so that a linear velocity in a circumferential direction at the irradiating position of said light beam is set to a constant value;
   an eccentricity measuring unit for measuring an eccentricity amplitude of one rotation of said medium and an eccentricity phase for a start position of one rotation;
   an eccentricity memory in which a region from the start position to an end position of one rotation of said medium is divided into a plurality of regions every predetermined rotational angle, addresses are sequentially allocated to said plurality of regions, and a sine value of each rotational angle which is increased every said predetermined rotational angle has been stored in each of said addresses;
   a read control unit for forming an address in said eccentricity memory corresponding to a rotating position of the medium where the light beam is irradiated at present while using the start position of one rotation of said medium as a reference and for reading out the correspondence sine value from said eccentricity memory by a designation of said address, said read control unit including:
      a rotational period detecting unit for detecting a medium rotational period according to the position in the radial direction of the medium where the light beam is irradiated at present,
      a 1-address rotating time detecting unit for detecting a 1-address rotating time indicative of a medium rotating time of one address by dividing said rotational period by the number of addresses in said eccentricity memory,
      a medium present position detecting unit for detecting a medium present position showing the rotating position of the medium where the light beam is irradiated at present while using the start position of one rotation of said medium as a reference, and
      a memory reading unit for comparing an address upper limit value in said eccentricity memory which is expressed by using said 1-address rotating time and is read out at present with said medium present position where the light beam is irradiated at present, for designating the same address and for reading out the sine value from said eccentricity memory when said medium present position is less than said address upper limit value, and for updating the address to an address obtained by adding "1" to the present address and for reading out the sine value from said eccentricity memory when said medium present position reaches said address upper limit value; and
   an eccentricity correcting unit for obtaining an eccentricity amount on the basis of the sine value read out by said read control unit and a measurement value measured by said eccentricity measuring unit, thereby controlling said positioner so as to set off said eccentricity amount.

2. An apparatus according to claim 1, wherein:
   said rotational period detecting unit detects the number (X) of rotational period pulses indicative of a medium rotational period according to the position in the radial direction of the medium where the light beam is irradiated at present by counting clock pulses of a predetermined frequency for one rotation of the medium;
   said 1-address rotating time detecting unit divides said rotational period pulse number (X) by the number (C) of addresses in said eccentricity memory and detects the number $\Delta X$ of rotational pulses of one address indicative of a medium rotating time corresponding to one address;
   said medium present position detecting unit repeats to count said sampling clock pulses while using the start position of one rotation as a reference and detects the number cnt of medium present position pulses indicative of the rotating position of the medium where the light beam is located at present; and
   said memory reading unit compares an address upper limit value $\Delta X(a+1)$ in said eccentricity memory which is expressed by using said 1-address rotational pulse number $\Delta X$ and is read out at present with said pulse number cnt at the medium present position where the light beam is irradiated at present, designates the same address (a) and reads out the sine value from said eccentricity memory when said pulse number cnt is less than said address upper limit value, and updates the address to an address obtained by adding "1" to the present address and reads out the sine value from said eccentricity memory when said pulse number cnt reaches said address upper limit value.

3. An apparatus according to claim 2, wherein when the medium present position pulse number cnt indicative of the medium rotating position where the light beam is positioned at present is detected, said medium present position detecting unit corrects said medium present position pulse number to a value without an eccentricity phase $\phi$ on the basis of the eccentricity phase $\phi$ obtained by said eccentricity measuring unit.

4. An apparatus according to claim 3, wherein said medium present position detecting unit converts the eccentricity phase measured by said eccentricity measuring unit to the number $X\phi$ of eccentricity phase pulses which is expressed by a count number of said reference clock pulses, when said medium present position pulse number cnt is equal to or larger than 0 and is less than said eccentricity phase pulse number $X\phi$, corrects said pulse number cnt to $cnt=(X-X\phi)+cnt,$ and when said medium present position pulse number cnt is equal to or larger than said eccentricity phase pulse number $X\phi$ and is less than said 1-rotational period pulse number (X), corrects the pulse number cnt to $cnt=cnt-X\phi.$ 5. An apparatus according to claim 1, wherein said read control unit further has a linear interpolating unit for detecting a sine value at the medium present position by a linear interpolation of the sine value read out from the eccentricity memory when the medium present position where the light beam is irradiated at present exists within a predetermined rotational angle corresponding to the address in said eccentricity memory.

6. An apparatus according to claim 5, wherein said linear interpolating unit designates an address (a) to which the medium present position where the light beam is irradiated at present belongs, reads out the sine value sinθa from said eccentricity memory, and obtains the linearly interpolated sine value by $sin\theta a+sin\Delta\theta \cdot (b/\Delta X)$ where, Δθ: rotational angle corresponding to one address, b: the number of pulses in one address indicative of the medium present position in a 1-address rotational pulse number Δx.

7. An apparatus according to claim 1, wherein said eccentricity correcting unit calculates an eccentricity correction amount (L) by $L=A \cdot sin\theta a$ where, sinθa: sine value read out by said read control unit A: eccentricity amplitude measured by said eccentricity measuring unit G: gain determined with respect to a 1-rotation reference period Tr at a reference position in the medium radial direction where the light beam is located.

8. An apparatus according to claim 7, wherein said eccentricity correcting unit corrects said eccentricity amplitude (A) to $A=A/(X/Xr)^4$ and calculates said eccentricity correction amount (L), where, Xr: the reference number of rotational period pulses in which a rotational period at a reference position in the radial direction of the medium which decides said gain (G) is expressed by a count value of reference clock pulses, X: the number of rotational period pulses indicative of the rotational period at the position in the medium radial direction where the light beam is located at present.

9. An apparatus according to claim 8, wherein said eccentricity correcting unit corrects said gain when a change in rotational period pulse number (X) at the position in the medium radial direction where the light beam is located at present for the reference rotational period pulse number Xr is large.

10. An apparatus according to claim 1, wherein in the case where the rotational period continuously changes every rotation by on-track controlling the light beam to the medium track formed spirally, said read control unit obtains parameters necessary to read out the eccentricity memory with respect to the first medium track and, after that, proportionally changes each of said parameters on the basis of the change in rotational period corresponding to one track, thereby performing a read control of the eccentricity memory.

11. An apparatus according to claim 1, wherein in the case where the rotational period continuously changes every rotation by on-track controlling the light beam to the medium track formed spirally, said read control unit detects the number (X) of rotational period pulses by counting reference clock pulses with respect to the first medium track and, after that, changes said rotational period pulse number (X) every change number of pulses of the rotational period corresponding to one track, thereby performing a read control of the eccentricity memory.

12. An apparatus according to claim 1, wherein in case of seeking the light beam by said access control unit to the target track, said linear velocity control unit changes a rotational speed to a rotational speed in which a linear velocity on the target track is constant prior to starting the seeking operation, executes the measuring process by said eccentricity measuring unit in this state, and after that, allows the light beam to seek to the target track.

13. An apparatus according to claim 12, wherein the medium rotational speed in which the linear velocity when seeking to the target track is set to be constant is given from an upper apparatus.

14. An apparatus according to claim 1, wherein in case of seeking the light beam to the target track by said access control unit, said linear velocity control unit changes a rotational speed to a rotational speed in which a linear velocity on the target track is set to be constant after the light beam was sought to the target track, and the measuring process by said eccentricity measuring unit is executed in this state.

15. An apparatus according to claim 14, wherein the medium rotational speed in which the linear velocity when seeking to the target track is set to be constant is given from an upper apparatus.

16. An apparatus according to claim 1, wherein said eccentricity measuring unit measures eccentricity information in a specific zone or an arbitrary zone of said medium before said medium is loaded to the apparatus and the apparatus enters a ready mode.

17. An apparatus according to claim 1, wherein in a state where a driving of a carriage and a lens is stopped, said eccentricity measuring unit measures said eccentricity amplitude and eccentricity phase on the basis of a zero-cross detection of a tracking error signal according to the position in the direction of traversing the tracks of said light beam formed on the basis of a photosensing output of a medium return light derived by said optical unit.

18. An apparatus according to claim 17, wherein said eccentricity measuring unit obtains said eccentricity amplitude (A) by multiplying a track pitch to the half of the number of zero-cross points of said tracking error signal of one rotation of the medium obtained synchronously with a rotation detection signal indicative of one rotation of said medium and obtains a time, as said eccentricity phase φ, from a start position of one rotation of said rotation detection signal to a middle point of a maximum zero-cross interval time of said tracking error signal.

19. An apparatus according to claim 18, wherein said eccentricity measuring unit measures the number of zero-cross points of one rotation in an eccentricity correcting state by said eccentricity correcting unit based on measured eccentricity information and corrects the eccentricity phase φ obtained by the measuring process to an opposite phase when the number of zero-cross points by the eccentricity correction exceeds the number of zero-cross points at the time of the measurement.

20. An apparatus according to claim 19, wherein said eccentricity measuring unit adds a ½ rotational angle to the measured phase φ, thereby correcting to an eccentricity opposite phase (φ+180°) as an opposite phase.

21. An apparatus according to claim 17, wherein said eccentricity measuring unit executes twice the measurement of the eccentricity information and the eccentricity correction after the measurement, compares the numbers of zero-cross points of one rotation after completion of the eccentricity correction in the execution of said measurement and said eccentricity correction of said two times, and when a difference between the numbers of zero-cross points exceeds a predetermined threshold value, repeats the measurement and correction of the eccentricity until said difference is equal to or less than said threshold value.

* * * * *